US012700609B2

(12) United States Patent
Kim

(10) Patent No.: US 12,700,609 B2
(45) Date of Patent: Aug. 4, 2026

(54) APPARATUS AND METHOD FOR ASSEMBLING CELL BLOCK OF BATTERY

(71) Applicants:Hyundai Motor Company, Seoul (KR); Kia Corporation, Seoul (KR)

(72) Inventor: Kyung Mo Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 578 days.

(21) Appl. No.: 18/321,313

(22) Filed: May 22, 2023

(65) Prior Publication Data

US 2024/0154146 A1 May 9, 2024

(30) Foreign Application Priority Data

Nov. 4, 2022 (KR) .......................... 1020220145664

(51) Int. Cl.
*H01M 10/04* (2006.01)
(52) U.S. Cl.
CPC .............................. *H01M 10/0404* (2013.01)
(58) Field of Classification Search
CPC ........... H01M 10/0404; H01M 50/256; H01M 50/103; H01M 50/572
See application file for complete search history.

(56) References Cited

U.S. PATENT DOCUMENTS

| | | | | |
|---|---|---|---|---|
| 2015/0052741 A1* | 2/2015 | Bartos | .............. | H01M 10/0404 |
| | | | | 29/730 |
| 2019/0312251 A1 | 10/2019 | Matthews | | |
| 2019/0363393 A1* | 11/2019 | Hashem | ........... | H01M 10/0486 |
| 2024/0231328 A1* | 7/2024 | Tomasi | .............. | H01M 10/058 |

FOREIGN PATENT DOCUMENTS

| | | |
|---|---|---|
| CN | 106025324 | 10/2016 |
| JP | 2022-063861 | 4/2022 |
| KR | 10-1217449 | 1/2013 |
| KR | 10-2018- 009108 | 1/2018 |
| KR | 10-2187277 | 12/2020 |
| KR | 10-2250593 | 5/2021 |

* cited by examiner

*Primary Examiner* — Stewart A Fraser
(74) *Attorney, Agent, or Firm* — Fish & Richardson P.C.

(57) ABSTRACT

Disclosed are an apparatus and method for assembling a cell block of a battery. The apparatus includes an upstream assembly unit configured to assemble a two-cell body from at least two cells, and a midstream assembly unit configured to receive a first two-cell body and a second two-cell body, assembled by the upstream assembly unit, from the upstream assembly unit, and to assemble a four-cell body from the first two-cell body and the second two-cell body, and the upstream assembly unit and the midstream assembly unit are operated in connection with each other.

20 Claims, 36 Drawing Sheets

APPARATUS AND METHOD FOR ASSEMBLING CELL BLOCK OF BATTERY

CROSS-REFERENCE TO RELATED APPLICATION

This application claims under 35 U.S.C. § 119(a) the benefit of priority to Korean Patent Application No. 10-2022-0145664, filed on Nov. 4, 2022, the entire contents of which are incorporated herein by reference.

TECHNICAL FIELD

The present disclosure relates to a battery. More particularly, it relates to assembling a secondary battery.

BACKGROUND

Application of rechargeable secondary batteries is being gradually expanded. As examples, there are small-sized batteries which are used in electronic devices, and middle and large-sized batteries which are used in electric vehicles, energy storage systems, etc.

Conventionally, an electric vehicle driven by a motor has a secondary battery as a power storage device configured to drive the motor. In general, the secondary battery mounted in the electric vehicle is manufactured by subsequently assembling a battery cell, a battery module, and a battery pack, and the battery pack is finally mounted in the vehicle.

The volumetric energy density of the battery cells can have a great effect on the driving range of the electric vehicle. In other words, the maximum driving range of the electric vehicle may be increased by disposing as many cells as possible in a given space. In general, under a current battery pack manufacturing method, cells, modules, and packs are respectively modularized. In case a battery pack has a housing, the volumetric energy density of the cells (i.e., the volume occupied by the cells in a space allocated to mount the battery in the electric vehicle) is about 50 percent, and the other 50 percent is occupied by components for mechanical rigidity, battery cooling-related components and insulating and heat-insulating components, which are not related to the capacity of the battery.

Manufacture of a battery through a more simplified process may ultimately increase the driving range of an electric vehicle on a full change of the battery.

SUMMARY OF THE DISCLOSURE

The present disclosure has been made in an effort to solve the above-described problems associated with the prior art, and it is an object of the present disclosure to provide an apparatus for assembling a cell block of a battery, which may provide a simplified assembly process.

It is another object of the present disclosure to provide an apparatus for assembling a cell block of a battery, which enables automation of an assembly process.

In one aspect, the present disclosure provides an apparatus for assembling a cell block of a battery, the apparatus including an upstream assembly unit configured to assemble a two-cell body from at least two cells, and a midstream assembly unit configured to receive a first two-cell body and a second two-cell body, assembled by the upstream assembly unit, from the upstream assembly unit, and to assemble a four-cell body from the first two-cell body and the second two-cell body, wherein the upstream assembly unit and the midstream assembly unit are operated in connection with each other.

In another aspect, the present disclosure provides a method of assembling a cell block of a battery, the method including supplying two cells to an upstream assembly unit, assembling a two-cell body from the two cells by the upstream assembly unit, supplying a first two-cell body and a second two-cell body, sequentially assembled by the upstream assembly unit, to a midstream assembly unit, and assembling a four-cell body from the first two-cell body and the second two-cell body by the midstream assembly unit.

Other aspects and preferred implementations of the disclosure are discussed infra.

The above and other features of the disclosure are discussed infra.

BRIEF DESCRIPTION OF THE DRAWINGS

The above and other features of the present disclosure will now be described in detail with reference to certain exemplary implementations thereof illustrated in the accompanying drawings which are given hereinbelow by way of illustration only, and thus are not limitative of the present disclosure, and wherein:

FIG. 3 is a perspective view of an apparatus for assembling a cell block according to some implementations of the present disclosure;

FIGS. 7A to 7H are views illustrating a process of operating a midstream assembly unit according to some implementations of the present disclosure;

Figure 1A:
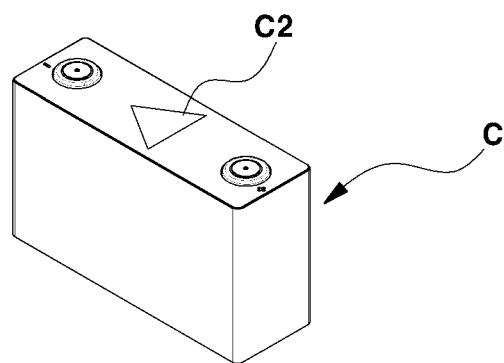
FIG. 1A is a perspective view showing an exemplary prismatic cell for secondary batteries.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Specific structural or functional descriptions in implementations of the present disclosure set forth in the description which follows will be exemplarily given to describe the implementations of the present disclosure, and the present disclosure may be embodied in many alternative forms. Further, it will be understood that the present disclosure should not be construed as being limited to the implementations set forth herein, and the implementations of the present disclosure are provided only to completely disclose the disclosure and cover modifications, equivalents or alternatives which come within the scope and technical range of the disclosure.

In the following description of the implementations, terms, such as "first" and "second," are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for the purpose of describing particular implementations only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Hereinafter the present disclosure will be described in detail with reference to the accompanying drawings.

As part of an effort to increase the volumetric energy density of cells, as described above, a cell-to-pack (CTP) battery, in which cells are assembled directly into a pack without being assembled into modules, has emerged in recent years.

Figure 1B:
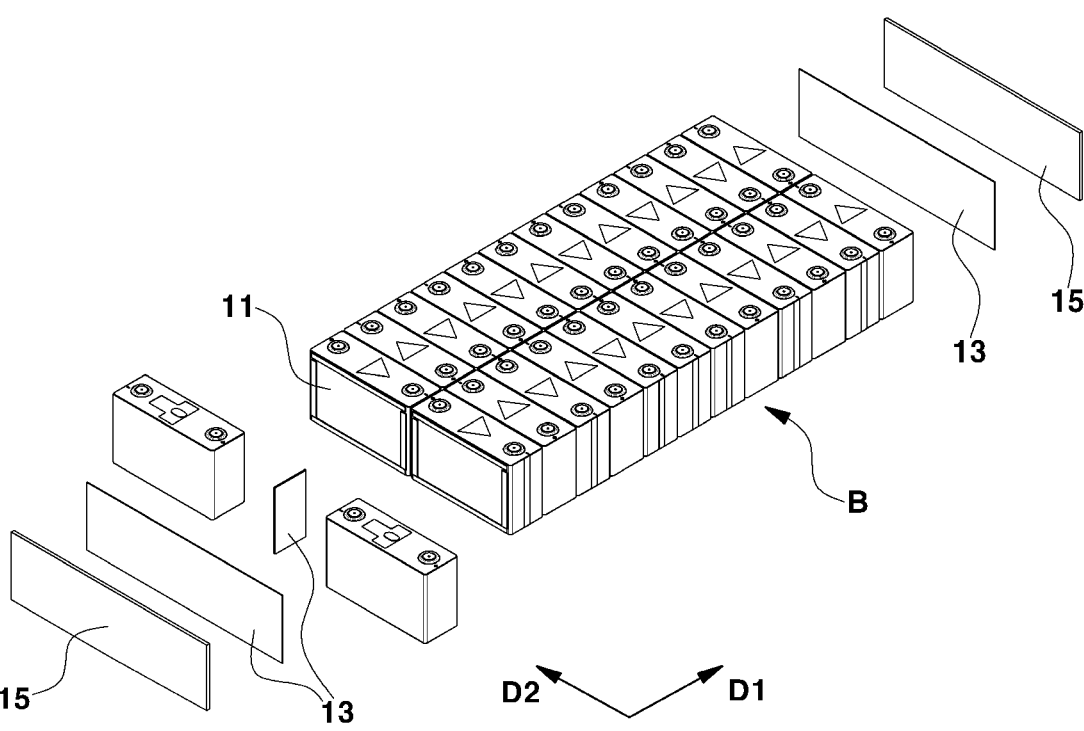
FIGS. 1B and 1C are views illustrating an exemplary process of manufacturing a CTP battery.
Figure 1C:
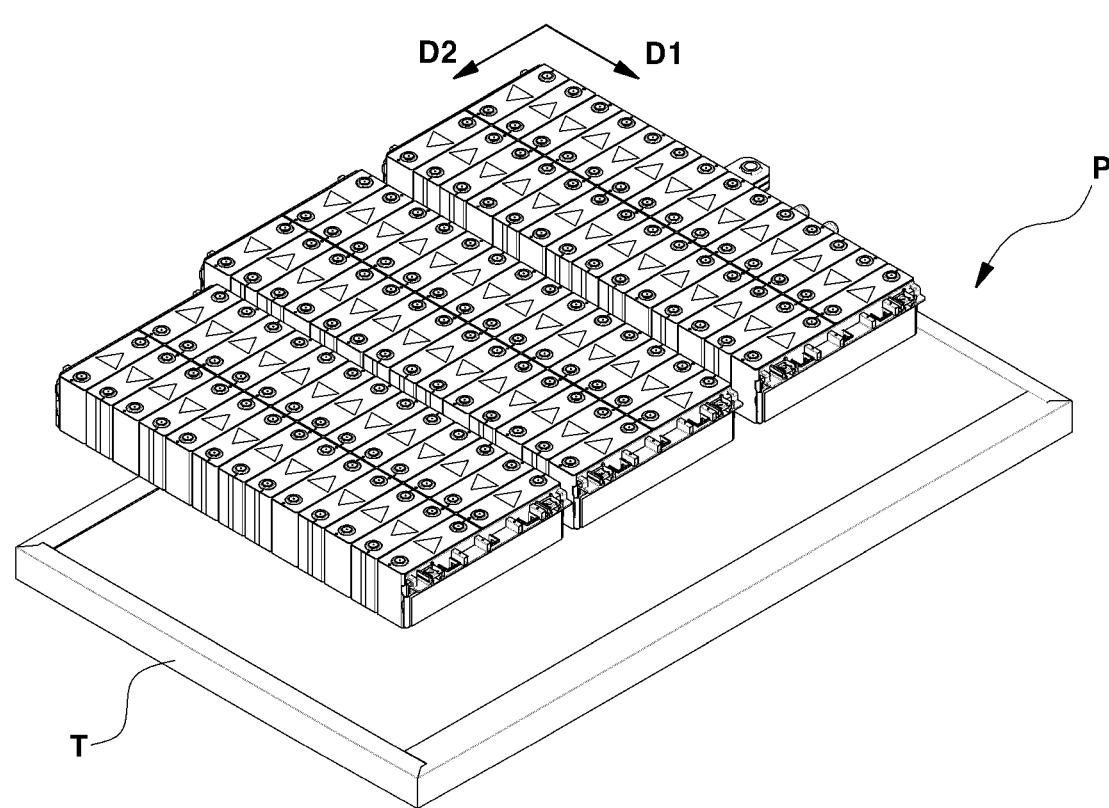

As shown in FIGS. 1A to 1C, in a CTP battery, a cell block B is formed by stacking a plurality of prismatic cells C, for example, 20 to 30 cells C. Gap pads 11 are attached between the cells C in a longitudinal direction D1 of the cell block B. The gap pads 11 serve to absorb swelling of the cells C. Further, insulating pads 13 are attached between the cells C in a transverse direction D2 of the cell block B. The insulating pads 13 serve to insulate the cells C from each other. The insulating pads 13 are also attached to both ends of the cell block B in the longitudinal direction D1 thereof. End plates 15 are mounted at the outermost ends of the cell block B, thereby completing manufacture of the cell block B.

Further, in the CTP battery, a plurality of cell blocks B, manufactured by the above-described process, is press-fit into a tray T of a battery pack P. In the CTP battery, the prismatic cells C are not mounted in the tray T one by one, but a designated number of the prismatic cells C is gathered and assembled into a block B, and the assembled blocks B are press-fitted into the tray T of the battery pack P by applying a designated pressure to the blocks B. After the blocks B are inserted into the tray T of the battery pack P, electronic components are assembled therewith, and battery systemization is achieved through application of an sealing structure. Thereafter, a modularized complete product of the battery pack P is assembled with a target object, for example, the lower part of a vehicle body frame.

As one example, assembly of the cell block B may be performed by a process of applying an adhesive (i.e., applying the adhesive between two cells C placed in parallel in the transverse direction D2 of the cell block B), a process of assembling the two cells C (i.e., adhering the insulating pad 13 between the two cells C to which the adhesive is applied, and mating the two cells C), a process of adhering a face pressure pad (i.e., adhering the insulating pad 13 between cells C stacked in the longitudinal direction D1), and a finishing process (i.e., a process of assembling the cells into the cell block B while properly maintaining the polarities of the cells C in the cell block B).

The cell block B is assembled by a series of the separate processes. However, when these processes are performed, many unnecessary operations are involved, so a lead time is increased and required equipment is increased. Further, a conveyer logistics system for movement between the respective process is required. Unnecessary equipment operations, which are not related to assembly of the cell block B, such as entrance to the assembly process of the cell block B, exit from the assembly process of the cell block B, and loading onto a conveyer, may be increased. Consequently, these operations may reduce efficiency of a mass production line. Further, in the assembly process of the cell block B, the number of contacts between the prismatic cells C and the equipment is increased, which increases the possibility of damage to the cells C during manufacture of the battery pack P.

Therefore, the present disclosure provides an apparatus for assembling a cell block of a battery, which may assemble the cell block from prismatic cells at one effect using a single apparatus. Thereby, the assembly process of the cell block may be simplified, and investment costs in mass production equipment may be reduced.

Further, the present disclosure proposes an apparatus for assembling a cell block, which may simplify the assembly process of the cell block to reduce the possibility of damage to cells during assembly of the cell block.

An apparatus for assembling a cell block according to the present disclosure may include an upstream assembly unit, a midstream assembly unit and a downstream assembly unit. Each assembly unit may be operatively associated with each other. Cells assembled by the upstream assembly unit may be transferred to the midstream assembly unit, and cells assembled by the midstream assembly unit may be transferred to the downstream assembly unit.

In another aspect, the smallest number of cells is assembled by the upstream assembly unit in the apparatus, and the largest number of cells is assembled by the downstream assembly unit in the apparatus. The midstream assembly unit may assemble a number of cells, which is between the number of cells assembled by the upstream assembly unit and the number of cells assembled by the downstream assembly unit.

Figure 2:
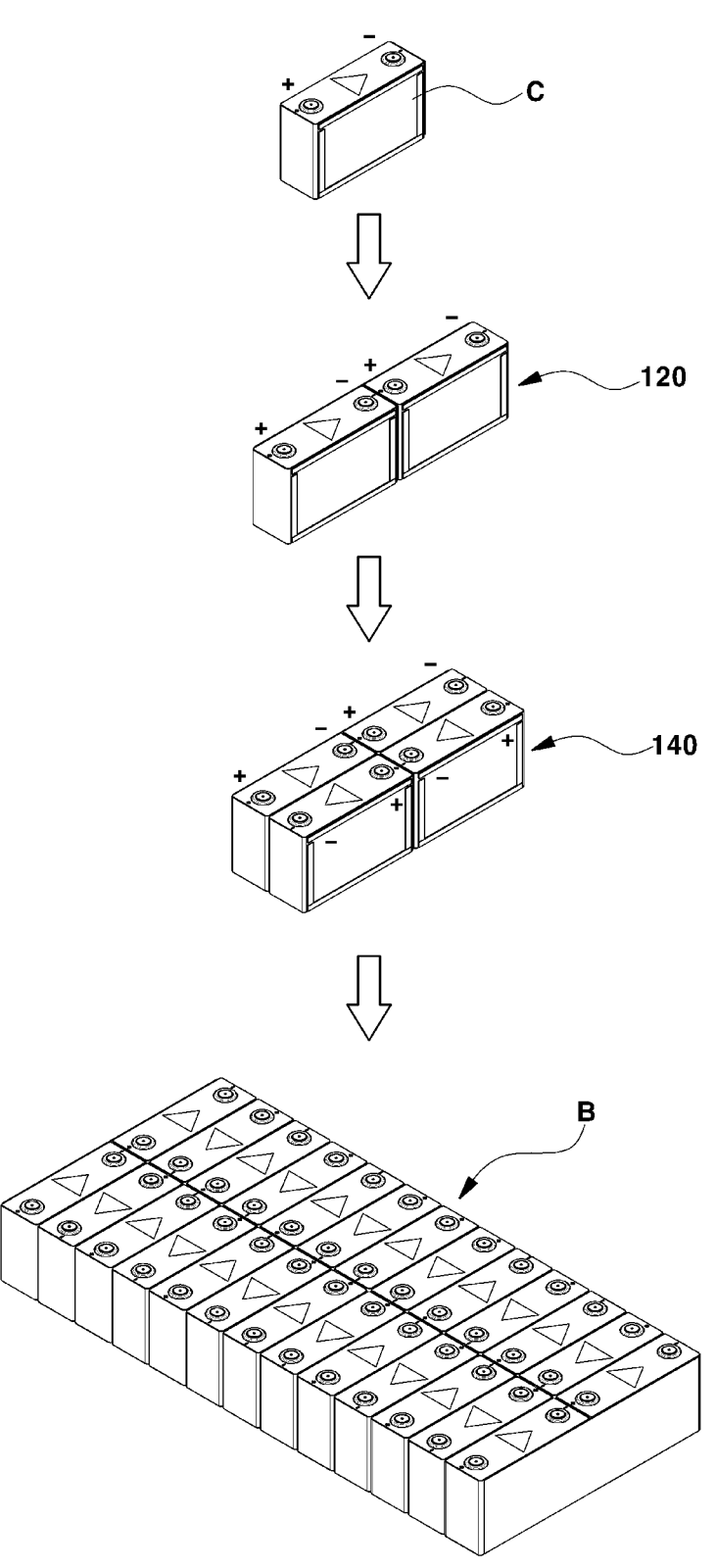
FIG. 2 is a conceptual view of a process of manufacturing a cell block of the CTP battery according to some implementations of the present disclosure.

For example, the upstream assembly unit of the apparatus according to the present disclosure may assemble a two-cell body 120 by bonding two cells C, as shown in FIG. 2. Thereafter, the midstream assembly unit may receive two-cell bodies 120 from the upstream assembly unit and may assemble a four-cell body 140 by bonding two two-cell bodies 120. Thereafter, the downstream assembly unit may receive four-cell bodies 140 from the downstream assembly unit and assemble the cell block B from a plurality of four-cell bodies 140.

Figure 3:
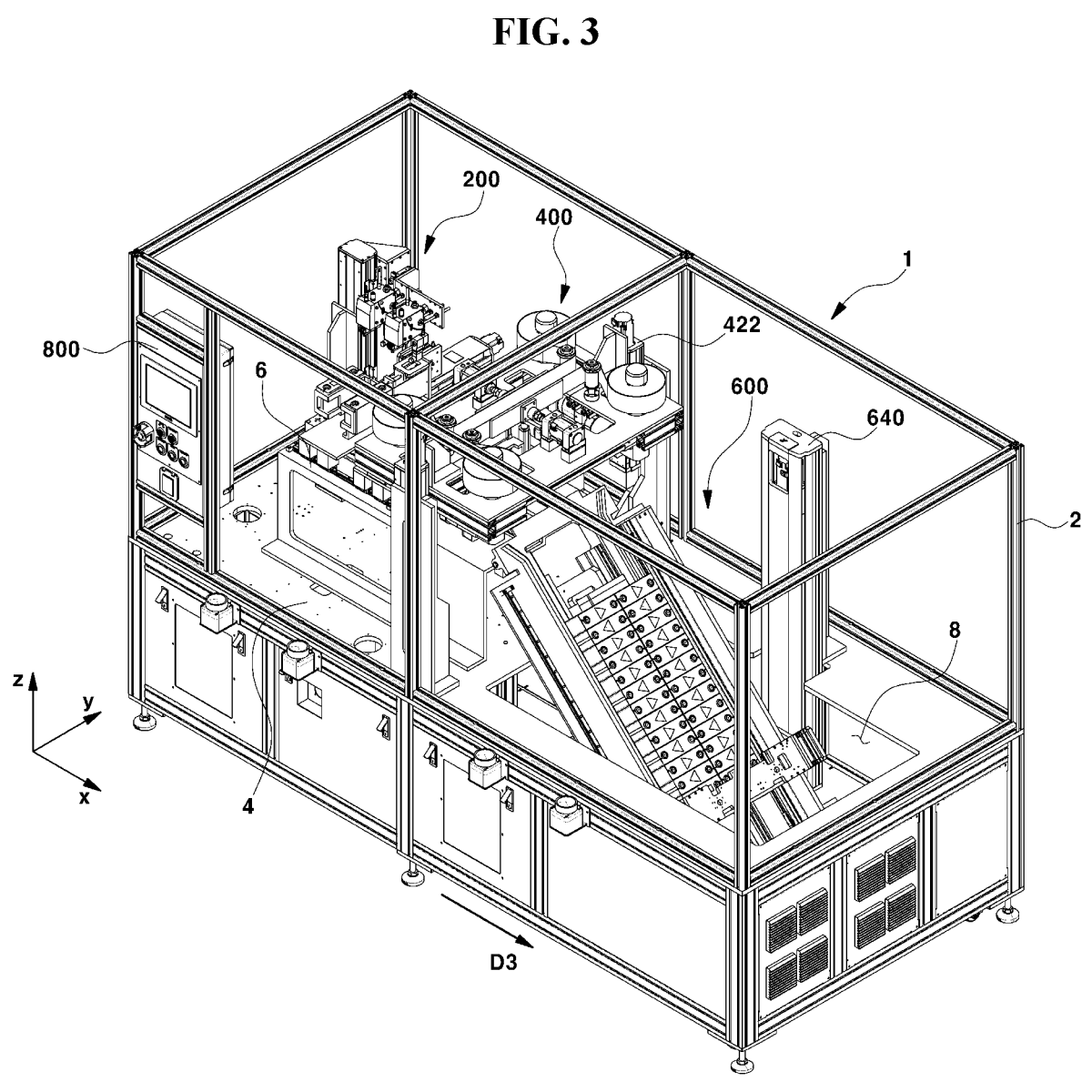
Figure 4:
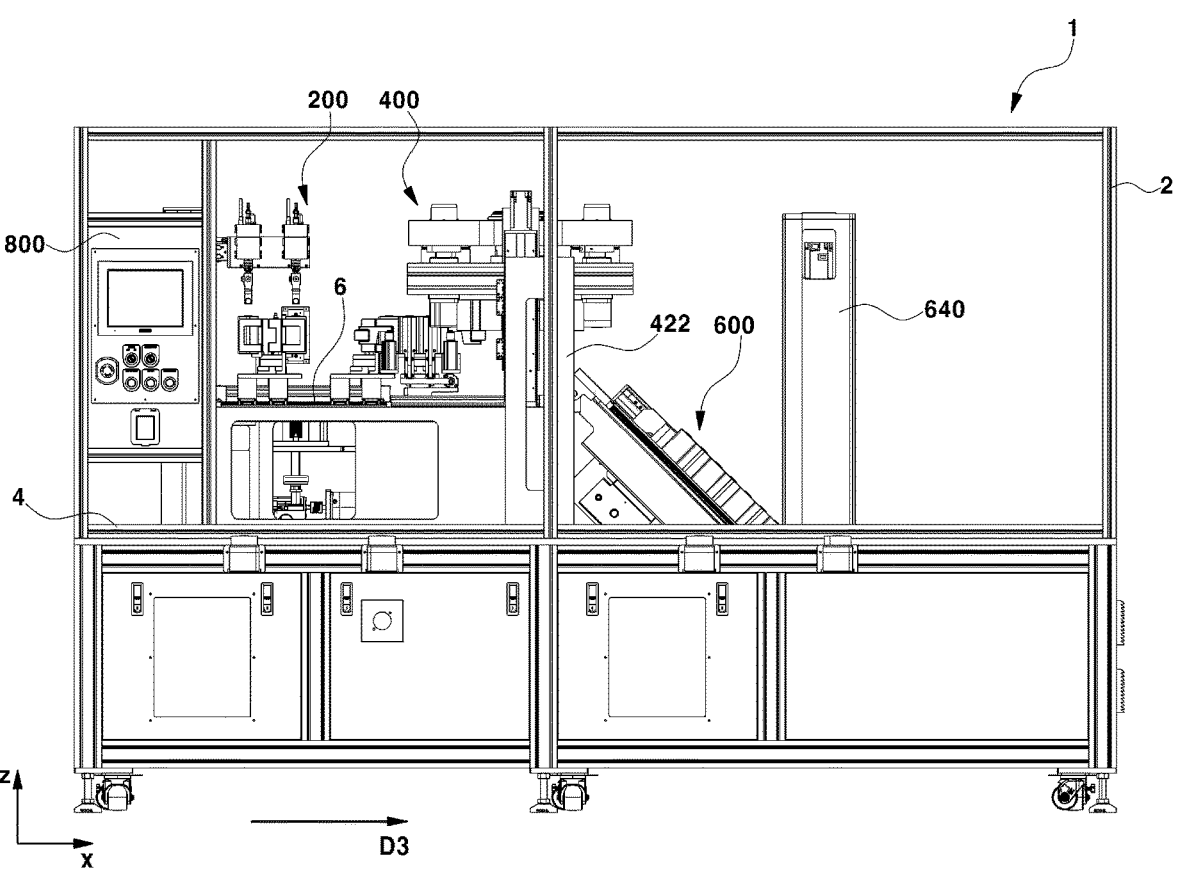
FIG. 4 is a front view of FIG. 3.

FIGS. 3 and 4 illustrate an apparatus 1 for assembly a cell block according to one implementation of the present disclosure, which may perform such assembly of the cell block. An upstream assembly unit 200, a midstream assembly unit 400 and a downstream assembly unit 600 may be disposed in the apparatus 1 to be continuously operated in connection with each other.

The apparatus 1 may include a frame 2 and a base 4. The frame 2 forms the framework of the apparatus 1 and is configured to support elements of the apparatus 1. The base 4 may be mounted on the frame 2 and may be provided at a designated height of the frame 2. Further, a platform 6 may be provided on the base 4. The platform 6 may provide a region elevated from the base 4 by a designated height. The base 4 may include an opening 8. The opening 8 may be disposed adjacent to the platform 6. The upper and lower sides of the base 4 may communicate with each other through the opening 8.

According to an implementation of the present disclosure, the upstream assembly unit 200 and the midstream assembly unit 400 may be provided on the platform 6. Further, the downstream assembly unit 600 may be located in the opening 8. By disposing the upstream assembly unit 200, the midstream assembly unit 400 and the downstream assembly unit 600 in this manner, the assembly process may be continuously performed more effectively. Hereinafter, the assembly units 200, 400 and 600 will be described in detail.

Referring to FIGS. 5A, 5B, 5C, 5D, 5E and 6, the upstream assembly unit 200 is configured to receive the individual cells C and then to assemble the two-cell body 120 from two cells C. Particularly, the upstream assembly unit 200 is configured to attach an insulating pad 238 between the two cells C and then to bond the two cells C to manufacture the two-cell body 120. For this purpose, according to an implementation of the present disclosure, the upstream assembly unit 200 includes a cell holder 210, an adhesive applicator 220, and a pad attacher 230.

The cell holder 210 may receive two cells C. In one implementation of the present disclosure, the cell holder 210 may be configured to support three faces out of six faces of each of the cells C. The remaining three faces, i.e., free faces, of each of the cells C may be exposed to the outside from the cell holder 210. A bonding face C1 of each of the cells C serves as the free face.

The cell holder 210 includes cut parts 212. The cut parts 212 allow a part of each of the cells C supported by the cell holder 210 to be exposed to the outside. The cut parts 212 of the cell holder 210 may be operated in connection with carrying arms 412 of the midstream assembly unit 400, which will be described later.

The cell holder 210 is configured to be rotatable. In one implementation of the present disclosure, the cell holder 210 includes a hinge point 214. The cell holder 210 is configured to be rotatable about the hinge point 214. In one implementation of the present disclosure, the cell holder 210 may be configured to be rotated by a cell holder driver 216, such as a motor configured to provide rotational force to the cell holder 210.

The cell holder 210 includes a pre-adhesion position P1 and a post-adhesion position P2. At the pre-adhesion position P1, the cell holder 210 is in a folded state (with reference to P1 in FIG. 5A). Thereby, the two cells C disposed in the cell holder 210 are disposed in parallel to be spaced apart from each other by a designated interval and do not come into direct contact with each other. At the post-adhesion position P2, to which the cell holder 210 is rotated from the pre-adhesion position P1, the cell holder 210 is unfolded in a straight line (with reference to P2 in FIG. 5E). That is, the post-adhesion position P2 indicates a position at which the cell holder 210 is rotated about the hinge point 214. In the post-adhesion position P2, the bonding faces C1 of the two cells C are bonded to each other with the insulating pad 238 interposed therebetween.

The cell holder 210 is configured to be movable. Particularly, the cell holder 210 may be moved along the flow direction of the assembly process, i.e., a process flow direction D3. For this purpose, according to one implementation of the present disclosure, the cell holder 210 includes an X-axis transporter 218 configured to move the cell holder 210 in the process flow direction D3 or in the X-axis direction. As a non-limiting example, the X-axis transporter 218 may include a linear mover.

The adhesive applicator 220 is configured to apply an adhesive to the bonding faces C1 of the prismatic cells C. As a non-limiting example, the adhesive may be a hot-melt adhesive.

The adhesive applicator 220 is configured to be vertically movable. Concretely, the adhesive applicator 220 is configured to be movable in the vertical direction or in the Z-axis direction. For this purpose, according to one implementation of the present disclosure, the adhesive applicator 220 may include a Z-axis transporter 222. As a non-limiting example, the Z-axis transporter 222 may include a linear mover.

In addition, the adhesive applicator 220 may be configured to be movable in a direction perpendicular to the process flow direction D3 or in the Y-axis direction. For this purpose, according to one implementation of the present disclosure, the adhesive applicator 220 may be disposed to be transported by the Y-axis transporter 224. The adhesive applicator 220 lowered to the bonding faces C1 of the cells C by the Z-axis transporter 222 may be moved toward the bonding faces C1 by the Y-axis transporter 224 to apply the adhesive to the bonding faces C1. According to one implementation of the present disclosure, the adhesive applicator 220 may be configured to apply the adhesive to the two cells C disposed in the cell holder 210 at the same time or at different times.

The pad attacher 230 is configured to attach the insulating pad 238 between the bonding faces C1 of the cells C. The insulating pad 238 serves to secure an insulating distance between the two cells C. The insulating pad 238 may be attached to any one of the two cells C disposed in the cell holder 210.

The pad attacher 230 is configured to be moved toward the cell holder 210 or the bonding face C of one of the cells C in the cell holder 210. For this purpose, the pad attacher 230 is provided on a Y-axis transporter 232.

Figure 6:
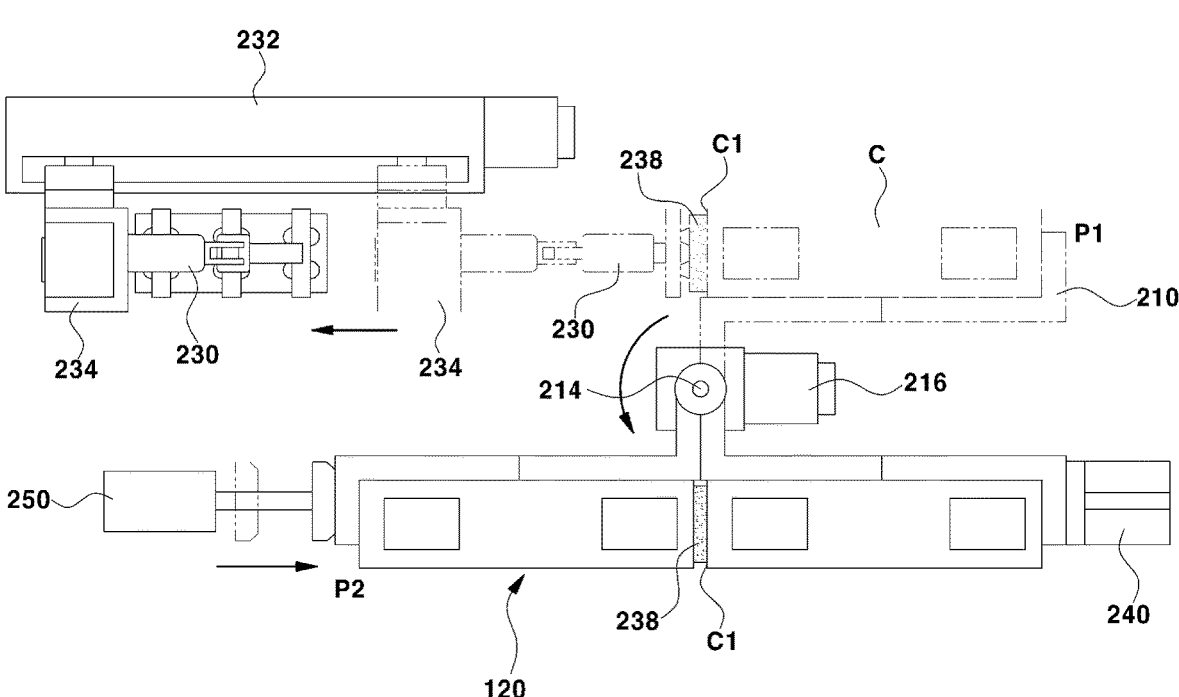
FIG. 6 is a conceptual view illustrating operation of a cell holder of the upstream assembly unit according to some implementations of the present disclosure.

As shown in FIG. 6, the pad attacher 230 is configured to be rotatable. In one implementation of the present disclosure, the pad attacher 230 includes a rotator 234. The rotator 234 rotates the pad attacher 230 around the X-axis with respect to the Y-axis transporter 232. A pad supplier 236 configured to supply the insulating pad 238 is provided at one side of the pad attacher 230. The pad attacher 230 receives the insulating pad 238 from the pad supplier 236 and then is moved toward the bonding face C1 of the cell C by the Y-axis transporter 232. Thereafter, the pad attacher 230 may be rotated by the rotator 234 and may attach the received insulating pad 238 to the bonding face C1 of the cell C.

Further, the upstream assembly unit 200 may further include a fixer 240 and a pressurizer 250. After the cell holder 210 is rotated from the pre-adhesion position P1 to the post-adhesion position P2, the fixer 240 may fix one side of the cell holder 210 and the pressurizer 250 may apply pressure to the other side of the cell holder 210, so as to firmly attach the cells C placed in the cell holder 210 to each other. In one implementation, the pad attacher 230 may also perform the function of the pressurizer 250.

Referring to FIGS. 7A, 7B, 7C, 7D, 7E, 7F, 7G, 7H, 8 and 9, the midstream assembly unit 400 is configured to receive two two-cell bodies 120 assembled by the upstream assembly unit 200 and to assemble the four-cell body 140 from the two-cell bodies 120. For this purpose, according to one implementation of the present disclosure, the midstream assembly unit 400 includes a rotary station 410 and a gap pad attacher 420.

The two two-cell bodies 120 may be sequentially supplied to the midstream assembly unit 400. Particularly, the rotary station 410 receives the two-cell bodies from the cell holder 210. For this purpose, the rotary station 410 may include the carrying arms 412. The carrying arms 412 may move the two-cell body 120 placed in the cell holder 210 to the rotary station 410. According to one implementation of the present disclosure, the carrying arms 412 are configured to drag the two-cell body 120 through the cut parts 212 of the cell holder 210 toward the rotary station 410 and may thus transport the two-cell body 120 to the rotary station 410.

The rotary station 410 is configured to be rotatable. For this purpose, a rotary motor 414 may be provided on the rotary station 410. For example, the rotary motor 414 may be supported by the platform 6 and may rotate the rotary station 410 about the Z-axis.

Further, the rotary station 410 is configured to be tiltable. In one implementation of the present disclosure, the rotary station 410 may include a tilt motor 416. That is, the rotary station 410 may be tilted at a designated angle in the Z-axis direction with a plane formed by the X-axis and the Y-axis or the base 4.

The gap pad attacher 420 is configured to attach gap pads 426 to the two-cell body 120 placed on the rotary station 410. The gap pads 426 serve to absorb and alleviate swelling of the cells C during use of the battery. It is sufficient to attach the gap pads 426 once during assembly of the four-cell body 140 by the midstream assembly unit 400. That is, the gap pads 426 may be attached to both surfaces of the two-cell body 120 which is moved first from the cell holder 210 to the rotary station 410.

According to one implementation of the present disclosure, the gap pad attacher 420 may be provided on the rotary station 410 or may be provided above the rotary station 410 in the Z-axis direction. The gap pad attacher 420 may be lowered to attach the gap pads 426 to both opposite surfaces of the two-cell body 120 on the rotary station 410. For example, a Z-axis transporter 422 may be provided on the base 4 to move the gap pad attacher 420. The gap pad attacher 420 may be mounted on the Z-axis transporter 422 to be movable in the Z-axis direction.

The gap pad attacher 420 may include a moving plate 424 configured to be movable along the Z-axis transporter 422.

Figure 9:
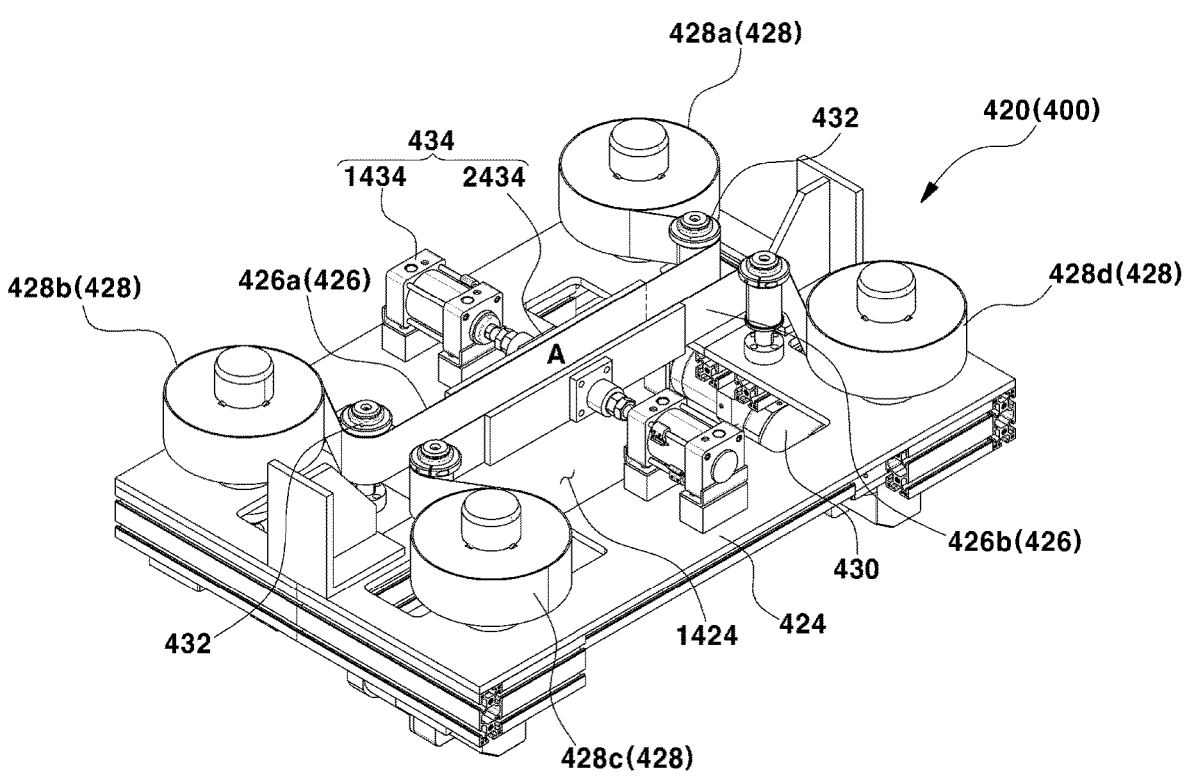
FIG. 9 is a perspective view of a gap pad attacher of the midstream assembly unit according to some implementations of the present disclosure.

As shown in FIG. 9, the gap pads 426 are continuously fed to the moving plate 424 to be attached to both surfaces of the two-cell body 120.

For this purpose, a plurality of winding rollers 428 on which the gap pads 426 are wound may be provided on the moving plate 424. For example, four winding rollers 428a, 428b, 428c, 428d may be provided. The gap pad attacher 420 includes a roller driver 430 configured to rotate the winding rollers 428. The roller driver 430 may rotate the winding rollers 428. Thereamong, a pair of first rollers 428a, 428b is connected by a first gap pad sheet 426a, and a pair of second rollers 428c and 428d is connected by a second gap pad sheet 426b. That is, the first gap pad sheet 426a and the second gap pad sheet 426b are fed to face each other.

Guide rollers 432 are disposed between the pair of first rollers 428a, 428b and/or between the pair of second rollers 428c, 428d. At least two guide rollers 423 may be disposed between the pair of first rollers 428a, 428b and/or between the pair of second rollers 428c, 428d. The guide rollers 432 guide movement of the gap pad sheets 426a, 426b and allow the gap pad sheets 426a, 426b to maintain constant tension.

The moving plate 424 may include operating units 434. Each of the operating units 434 may include an operation driver 1434 and a strip member 2434 to attach the gap pad 426 to the two-cell body 120. The operation driver 1434 provides force to the strip member 2434, and the strip member 2434 presses the gap pad 426. Cutoff lines may be provided on the gap pad sheets 426a, 426b so that the gap pad sheets 426a and 426b are cut into the gap pads 426 having a predetermined size along the cutoff lines. Both ends of the strip member 2434 may be aligned with the cutoff lines. The corresponding gap pad sheet 426a, 426b may be cut into the gap pad 426 along the cutoff lines when pressing force is applied by the operation driver 1434. As a non-limiting example, the operation driver 1434 may include a linear motor, a cylinder, etc., and the strip member 2434 may be formed of a material having designated stiffness.

The moving plate 424 includes an insert opening 1424. The two-cell body 120 located on the rotary station 410 is inserted into the insert opening 1424. The gap pad attacher 420 may be lowered to the rotary station 420 and may attach the gap pads 426 to the two-cell body 120.

The downstream assembly unit 600 may be operated in connection with the midstream assembly unit 400. The downstream assembly unit 600 may manufacture the cell block B by stacking a plurality of four-cell bodies 140 assembled by the midstream assembly unit 400.

The rotary station 410 is configured to be movable in the X-axis direction or the process flow direction D3. For this purpose, according to one implementation of the present disclosure, the rotary station 410 may be mounted on an X-axis transporter 418. After assembly of the four-cell body 140 is completed, the rotary station 410 may be moved to the downstream assembly unit 600 by the X-axis transporter 418.

Referring to FIGS. 10A to 10E, the downstream assembly unit 600 may be connected to the platform 6 at a designated angle. For example, the downstream assembly unit 600 may be disposed to be inclined from the X-axis in the Z-axis direction. In one implementation of the present disclosure, the downstream assembly unit 600 may be connected to the platform 6 through a hinge shaft 610. The hinge shaft 610 may be connected to a driver, such as a motor, to be rotatable, and the angle of the downstream assembly unit 600 may be adjusted by rotation of the hinge shaft 610.

The downstream assembly unit 600 includes a slider 620. The slider 620 is configured to be movable along the downstream assembly unit 600. Concretely, the slider 620 is disposed close to the proximal end of the downstream assembly unit 600, which is adjacent to the platform 6, to prevent the four-cell body 140 sliding from the tilted rotary station 410 from being damaged. The slider 620 is configured to move farther away from the proximal end of the downstream assembly unit 600 whenever another four-cell body 140 is added. Therefore, the slider 620 allows the cells C to be safely stacked without being damaged.

According to one implementation of the present disclosure, the downstream assembly unit 600 includes a pressing member 630 configured to be protrudable. The pressing member 630 may gently press the four-cell bodies 140 stacked on the downstream assembly unit 600 so that the four-cell bodies 140 may be firmly attached to each other and may hold the proximal end of the downstream assembly unit 600 when assembly of the cell block B has been completed. The pressing member 630 is configured to be drawn into the downstream assembly unit 600 or toward the lower part thereof when the four-cell body 140 is moved along the downstream assembly unit 600 and to be protruded again to press the four-cell bodies 140 when the four-cell bodies 140 are stacked.

As described above, the downstream assembly unit 600 may be rotated in a direction parallel to the X-axis direction in the state in which the downstream assembly unit 600 is tilted with respect to the platform 6. In one implementation, a lift 640 configured to elevate the downstream assembly unit 600 may be provided. The lift 640 may elevate the distal end of the downstream assembly unit 600 in the Z-axis direction or upwards or may lower the distal end of the downstream assembly unit 600 downwards.

Figure 11A:
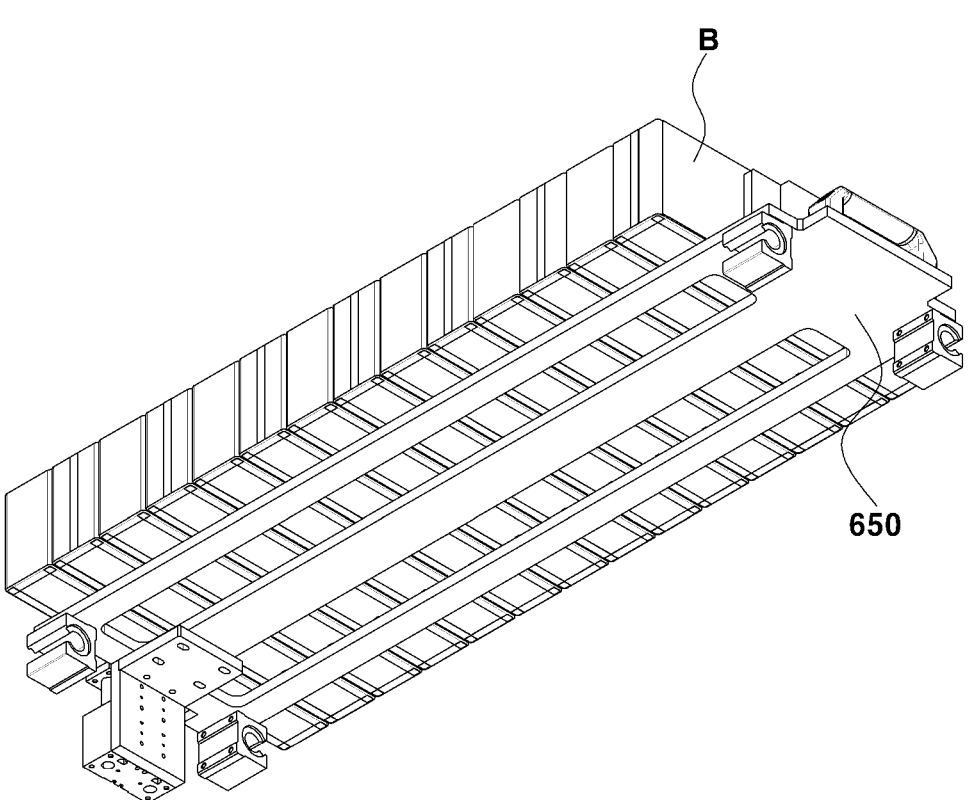
FIGS. 11A to 11B are perspective views of a cell block assembled and discharged by the apparatus according to the present disclosure.
Figure 11B:
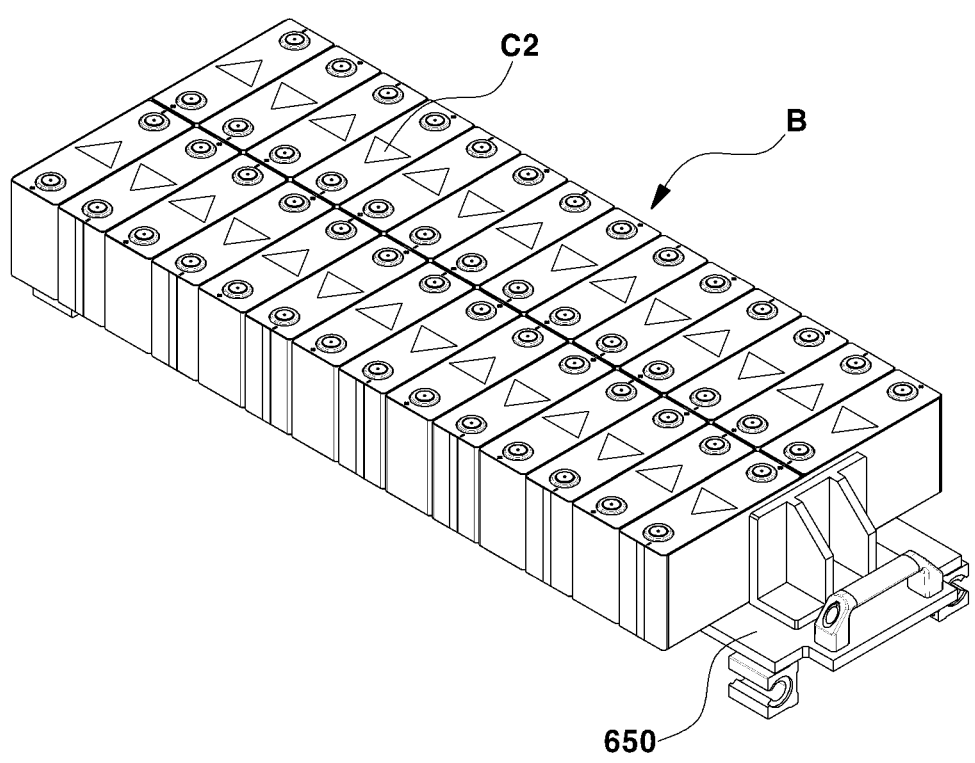

Referring to FIGS. 11A and 11B, the downstream assembly unit 600 may further include a detachable pallet 650. The pallet 650 may be detachably mounted in the downstream assembly unit 600 to easily separate the cell block B from the downstream assembly unit 600 when assembly of the cell block B has been completed.

Hereinafter, additionally referring to FIGS. 12A to 12H, the operation of the apparatus 1 according to the present disclosure will be described.

Figure 5A:
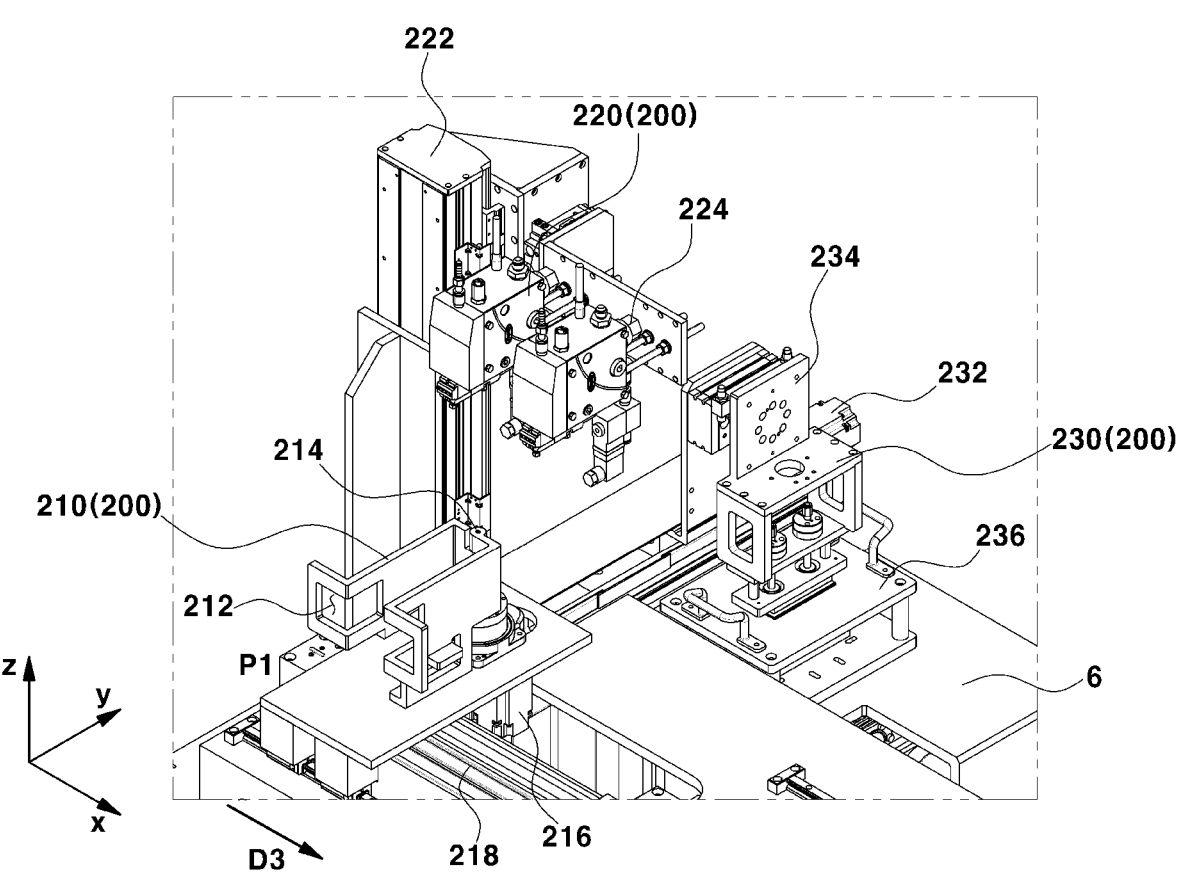
FIGS. 5A to 5F are views illustrating a process of operating an upstream assembly unit according to some implementations of the present disclosure.

First, as shown in FIG. 5A, the upstream assembly unit 200 starts assembly of two-cell bodies 120.

Figure 5B:
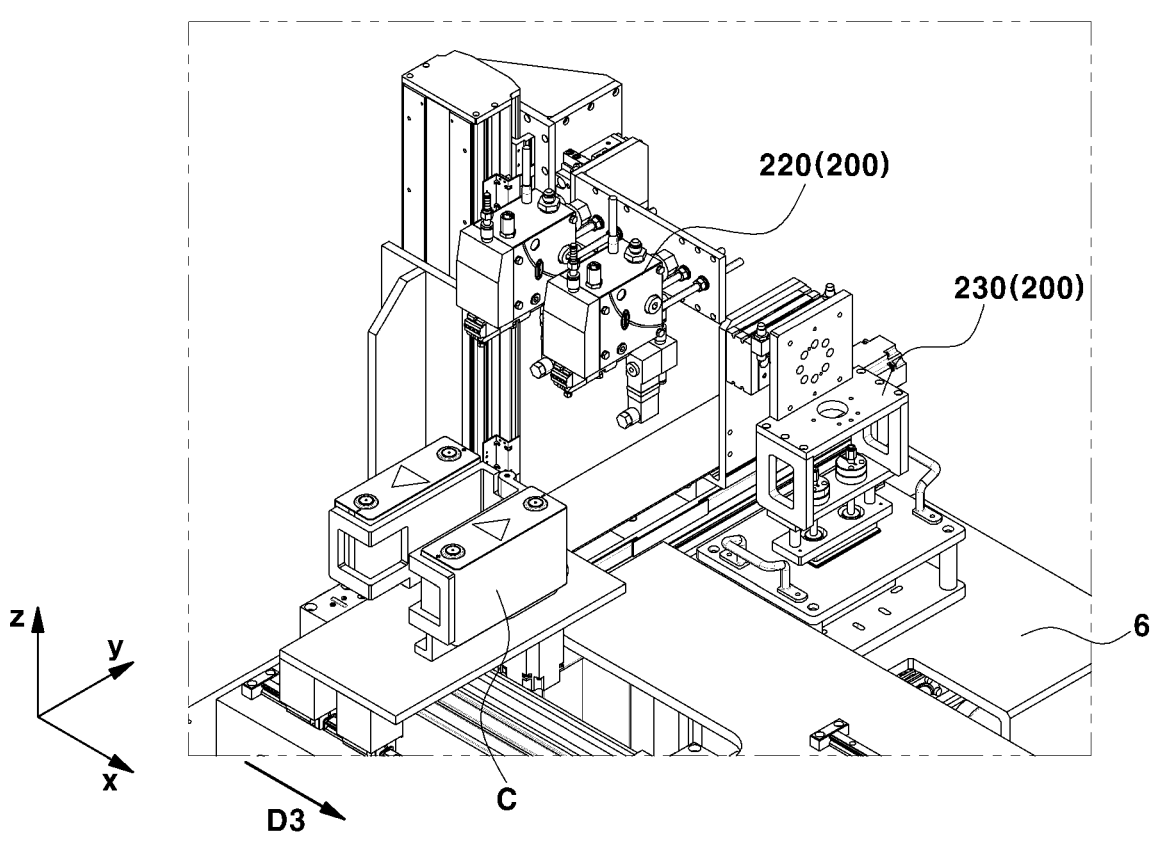

As shown in FIG. 5B, two cells C are disposed in the cell holder 210. As a polarity identifier C2 is provided on each of the cells C, the cells C may be put into the cell holder 210 with a correct polarity. In some implementations, a separate device configured to mount the cells C in the cell holder 210 may be provided.

Figure 5C:
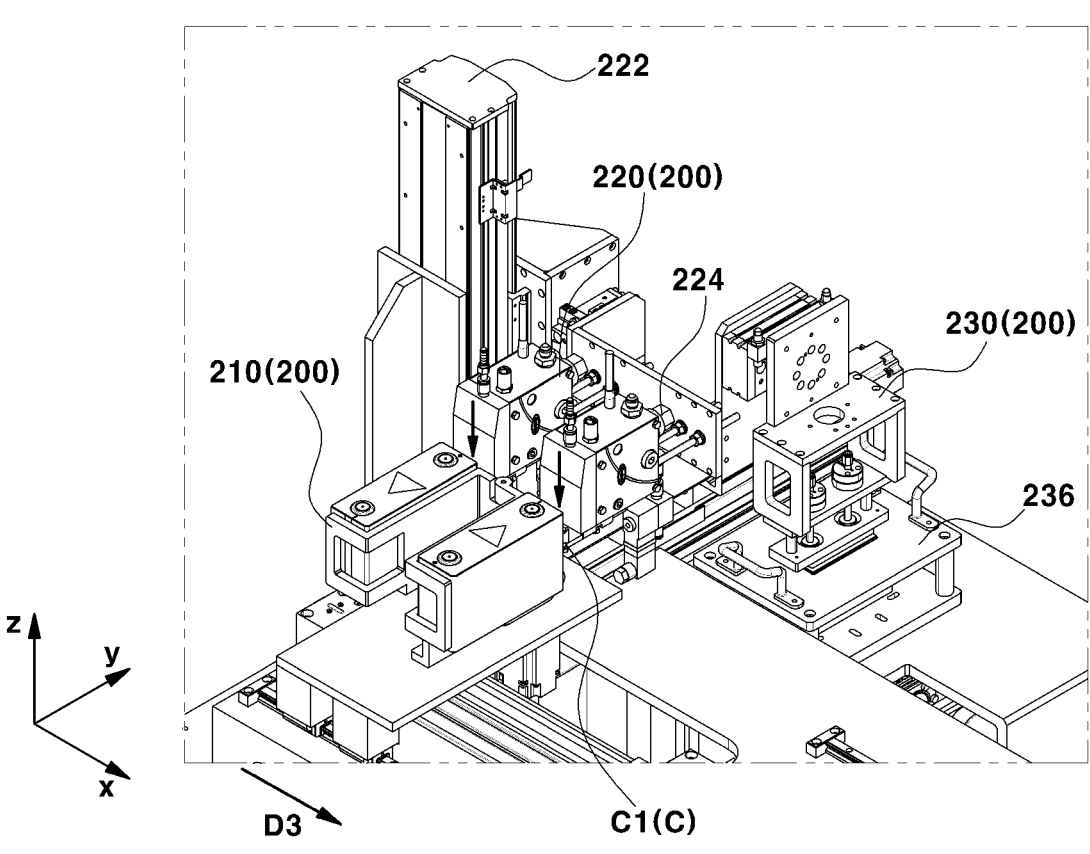

Referring to FIG. 5C, the adhesive is applied to the bonding faces C1 of the cells C. The adhesive attacher 220 is lowered to the bonding faces C1 of the cells C by the Z-axis transporter 222, applies the adhesive to the bonding faces C1 of the cells C, and is then returned to the original position thereof by the Z-axis transporter 222. At this time, the pad attacher 230 holds the insulating pad 238 from the pad supplier 236. The pad attacher 230 may take the insulating pad 238 out of the pad supplier 236 using a vacuum adsorption method.

Figure 5D:
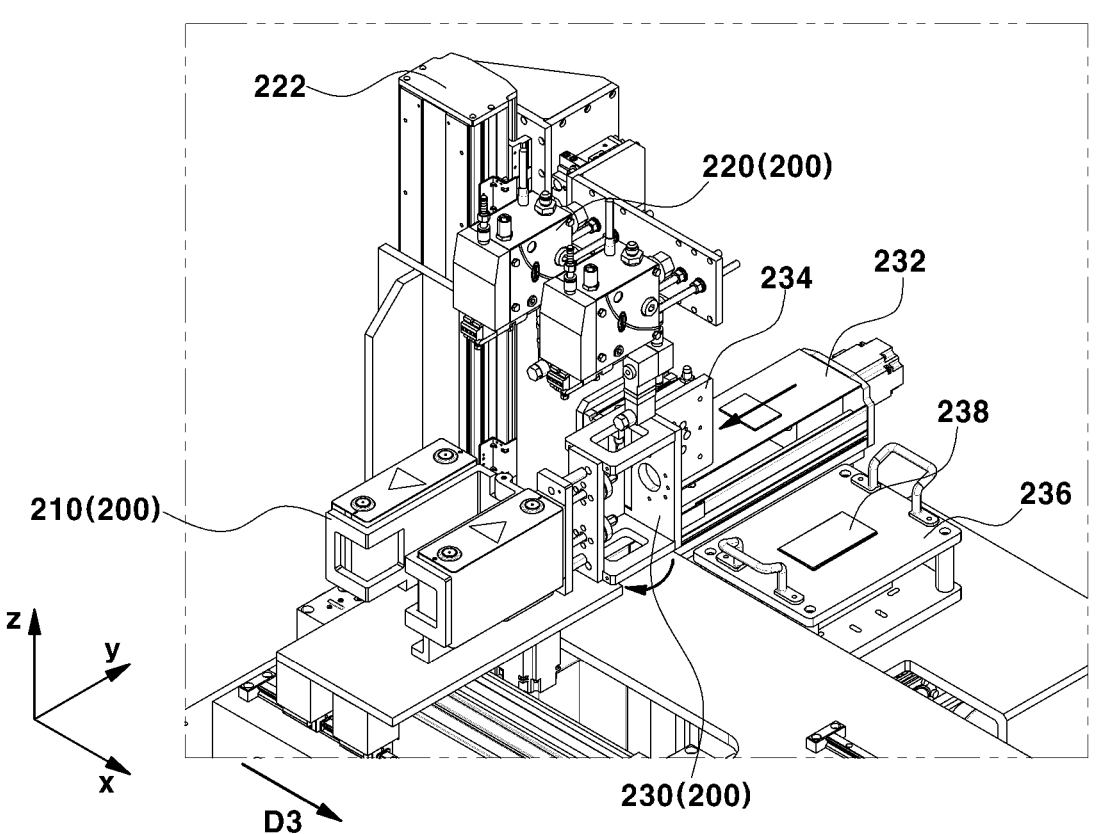

As shown in FIG. 5D, the pad attacher 230 is moved toward the cells C by the Y-axis transporter 232 to attach the insulating pad 238 to at least one of the bonding faces C1 of the cells C. When the pad attacher 230 reaches a predetermined position, the pad attacher 230 is rotated by the rotator 234. The insulating pad 238 facing toward the negative Z-axis is now aligned with the bonding face C1 of one of the cells C. The insulating pad 238 is attached to the bonding face C1 by the operation of the pad attacher 230, such as release of vacuum.

Figure 5E:
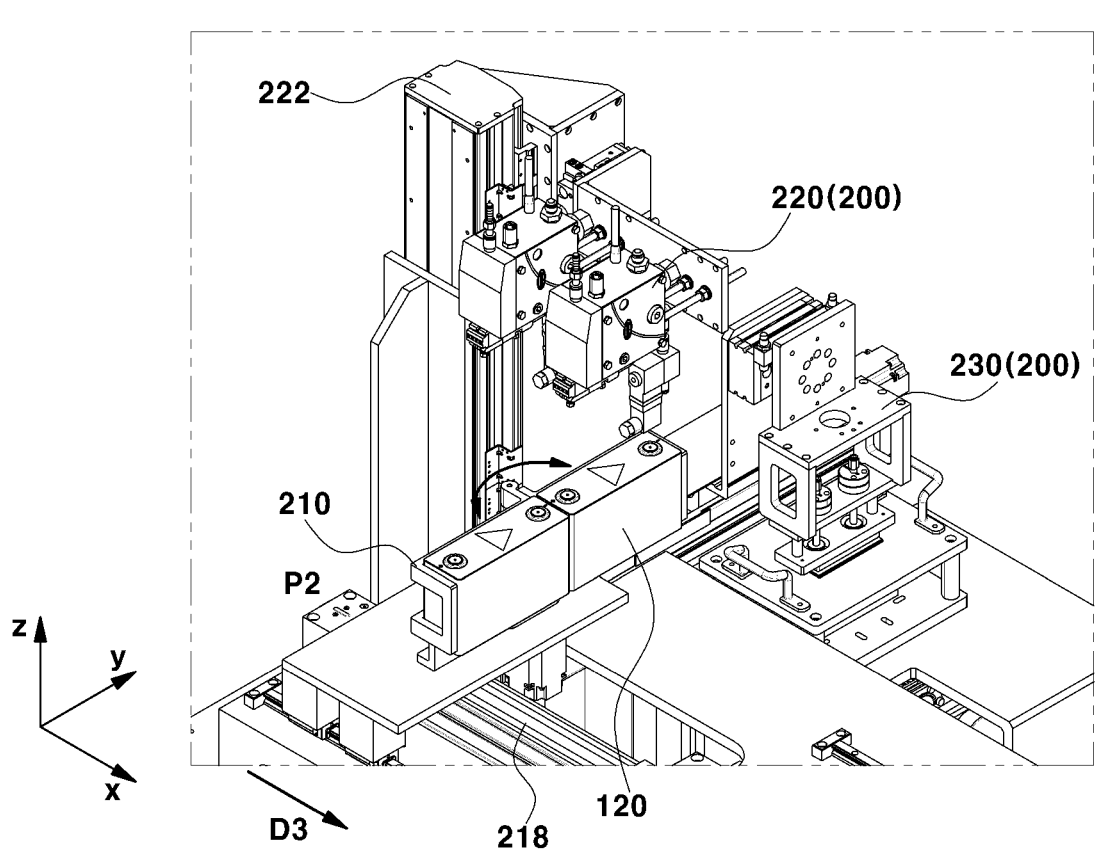

After the insulating pad 238 is attached to the bonding face C1, as shown in FIG. 5E, the cell holder 210 is rotated around the hinge point 214 by operation of the cell holder driver 216. Then the two-cell body 120 may be assembled. As described above, the two cells C may be more firmly attached to each other by pressing the cell holder 210 by the fixer 240 and the pressurizer 250.

Figure 5F:
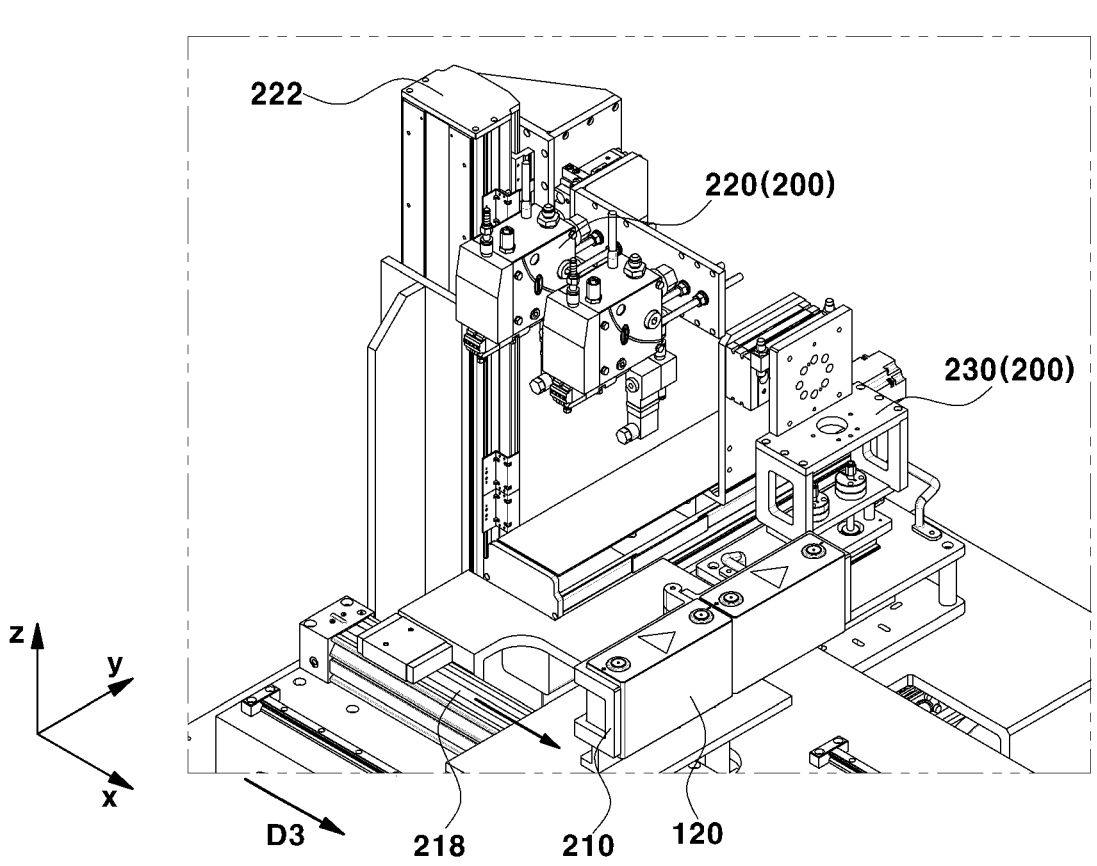

As shown in FIG. 5F, after assembly of the two-cell body 120 is completed, the X-axis transporter 218 moves the cell holder 210 toward the midstream assembly unit 400 in the process flow direction D3.

Figure 7A:
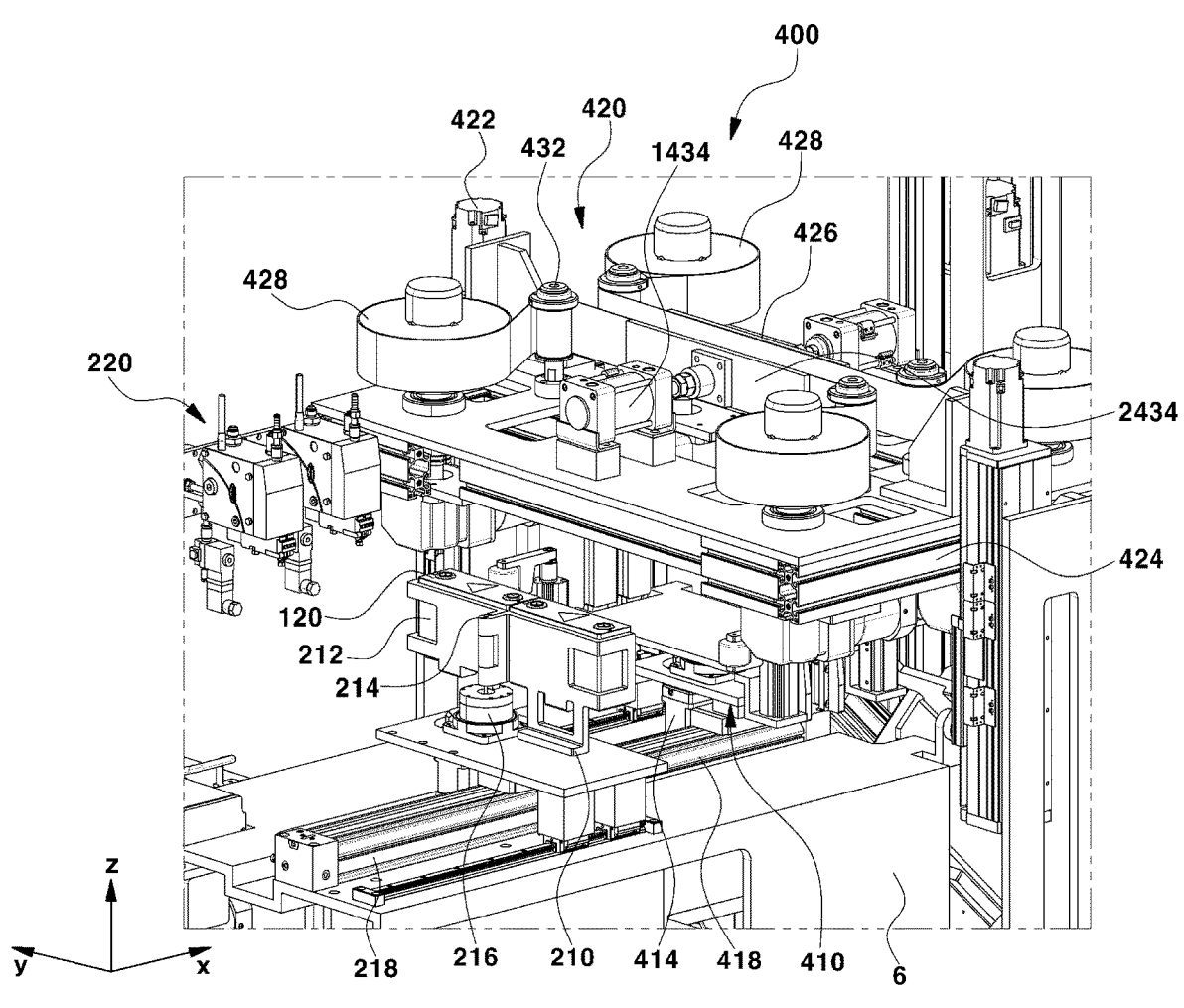
Figure 7B:
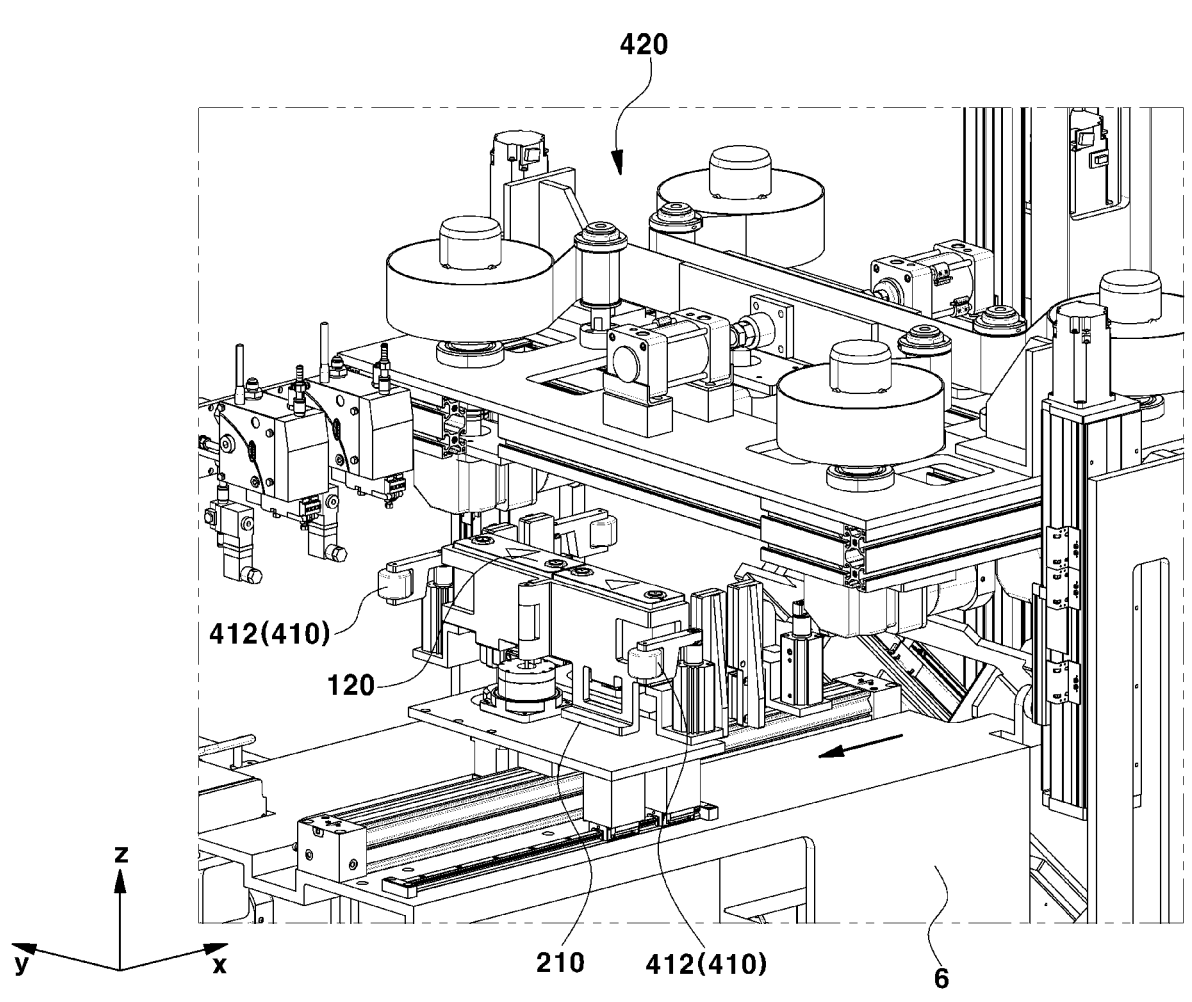
Figure 12A:
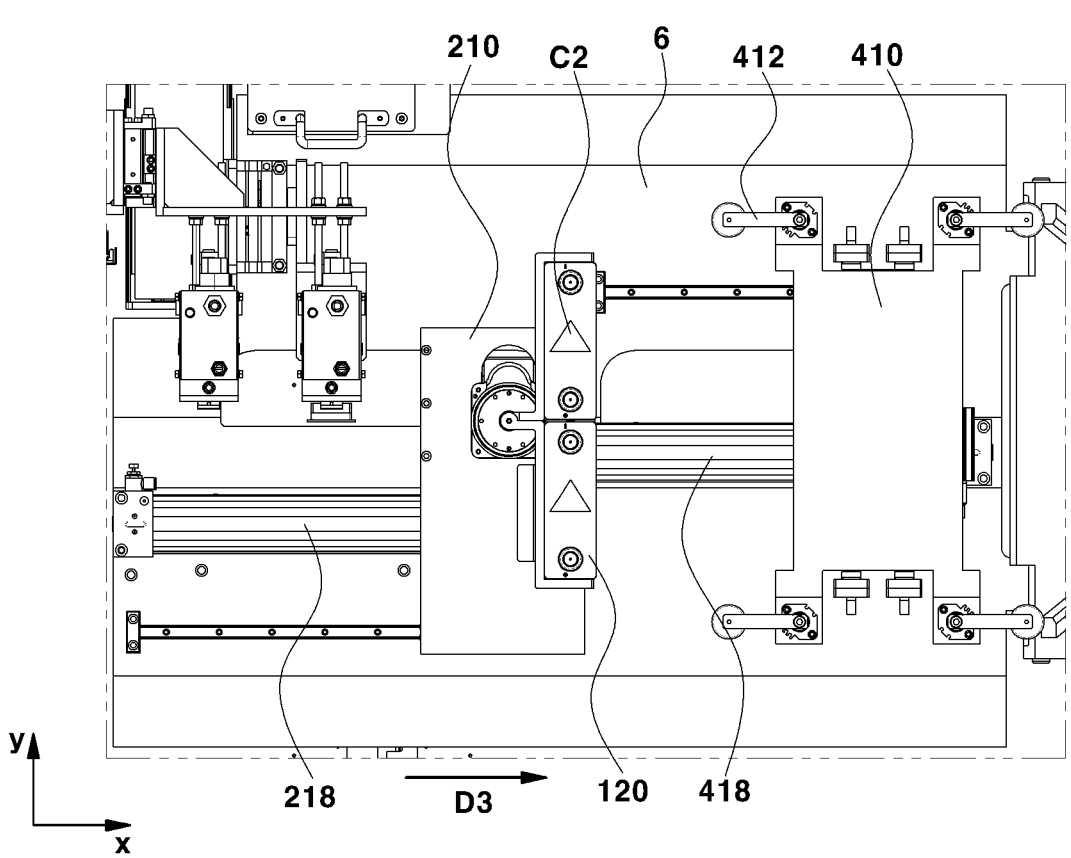
FIGS. 12A to 12H are views illustrating the process of operating the midstream assembly unit according to some implementations of the present disclosure, viewed from above.
Figure 12B:
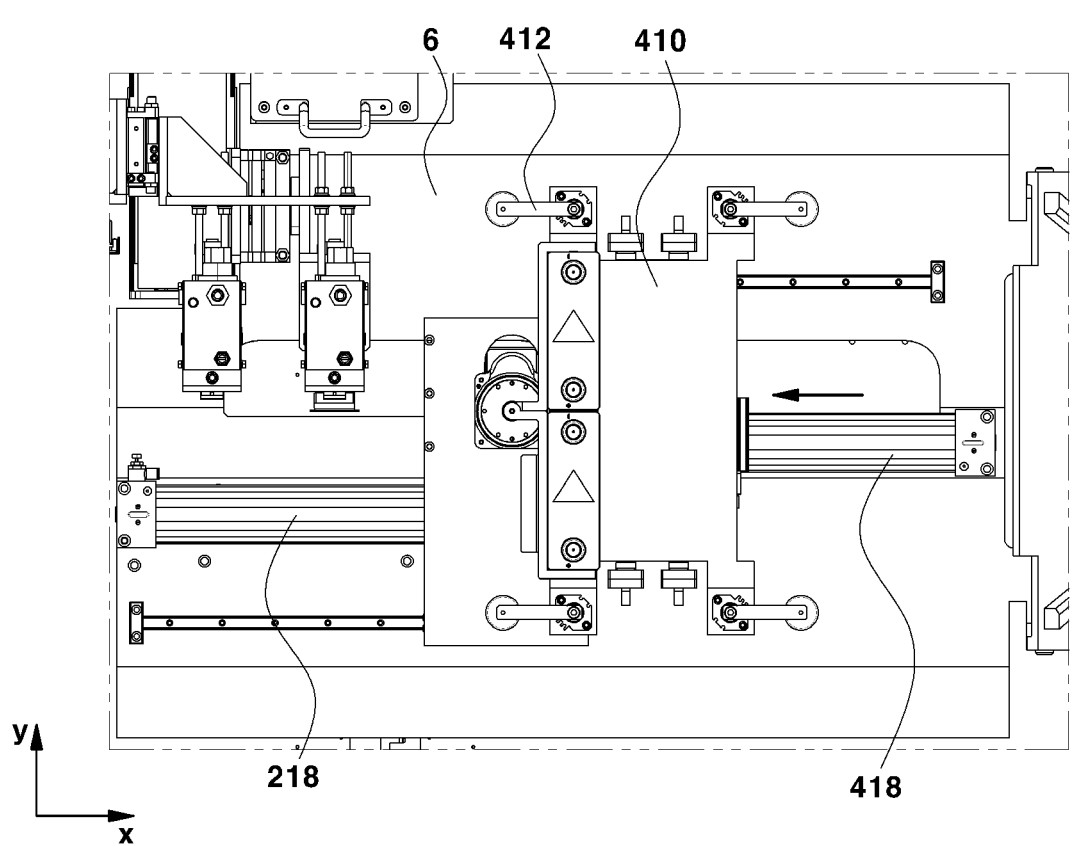

As shown in FIGS. 7A and 12A, the cell holder 210 in which the two-cell body 120 is mounted reaches the midstream assembly unit 400. The rotary station 410 is moved to a receipt position adjacent to the cell holder 210 by the X-axis transporter 418 to transport the two-cell body 120 (with reference to FIGS. 7B and 12B).

Figure 7C:
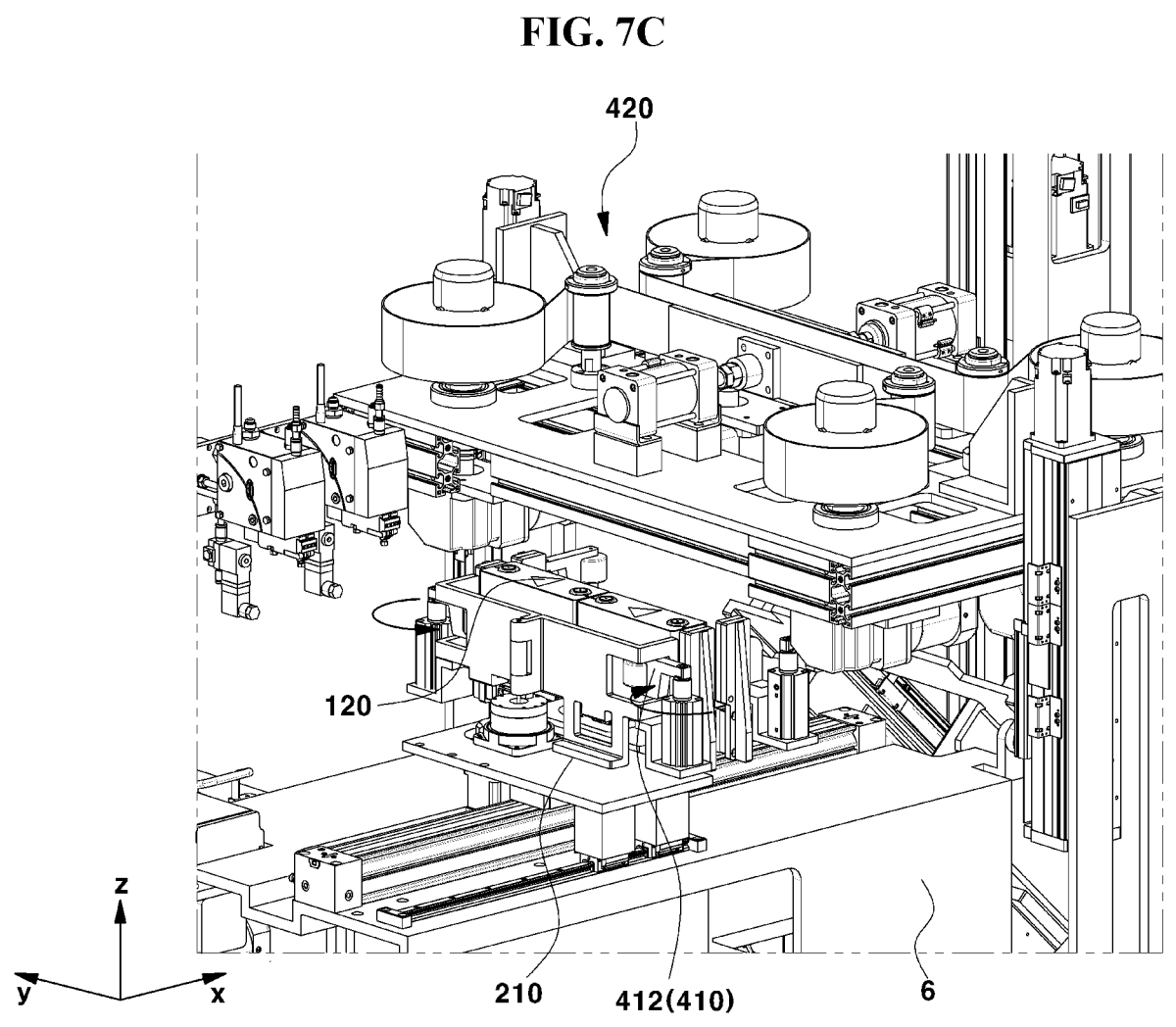
Figure 12C:
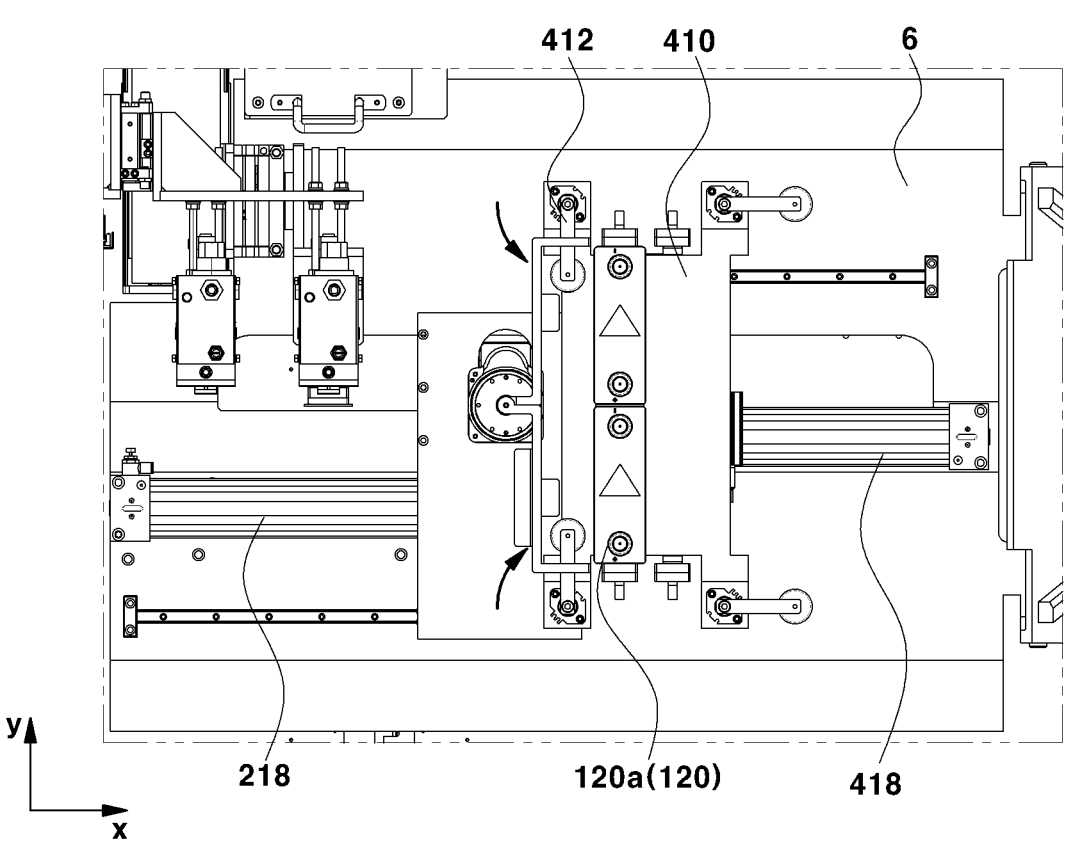

As shown in FIGS. 7C and 12C, the carrying arms 412 of the rotary station 410 come into contact with the two-cell body 120 through the cut parts 212. The carrying arms 412 locate the two-cell body 120 at a predetermined position on the rotary station 410 while being rotated in a direction of pushing the two-cell body 120 toward the rotary station 410.

Figure 7D:
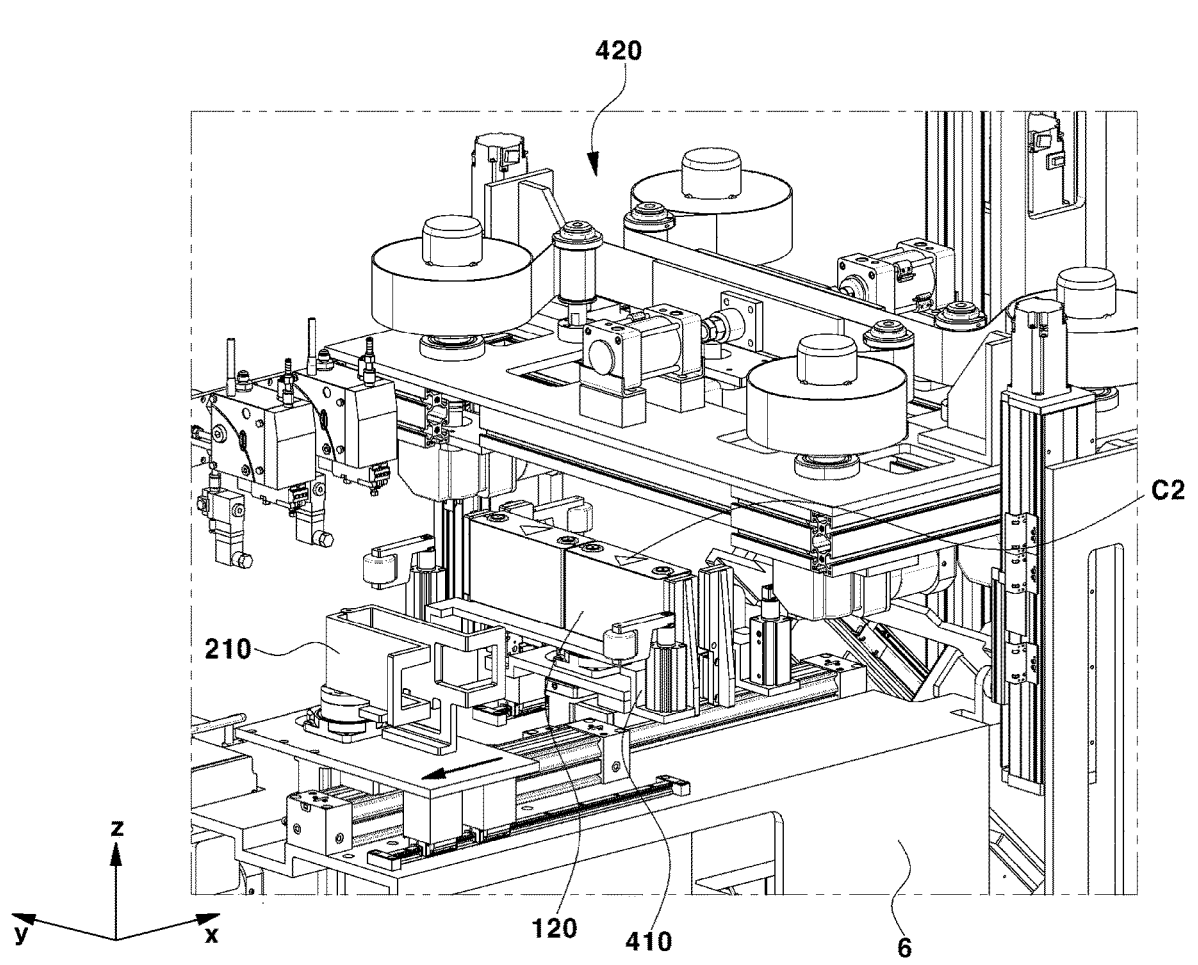
Figure 12D:
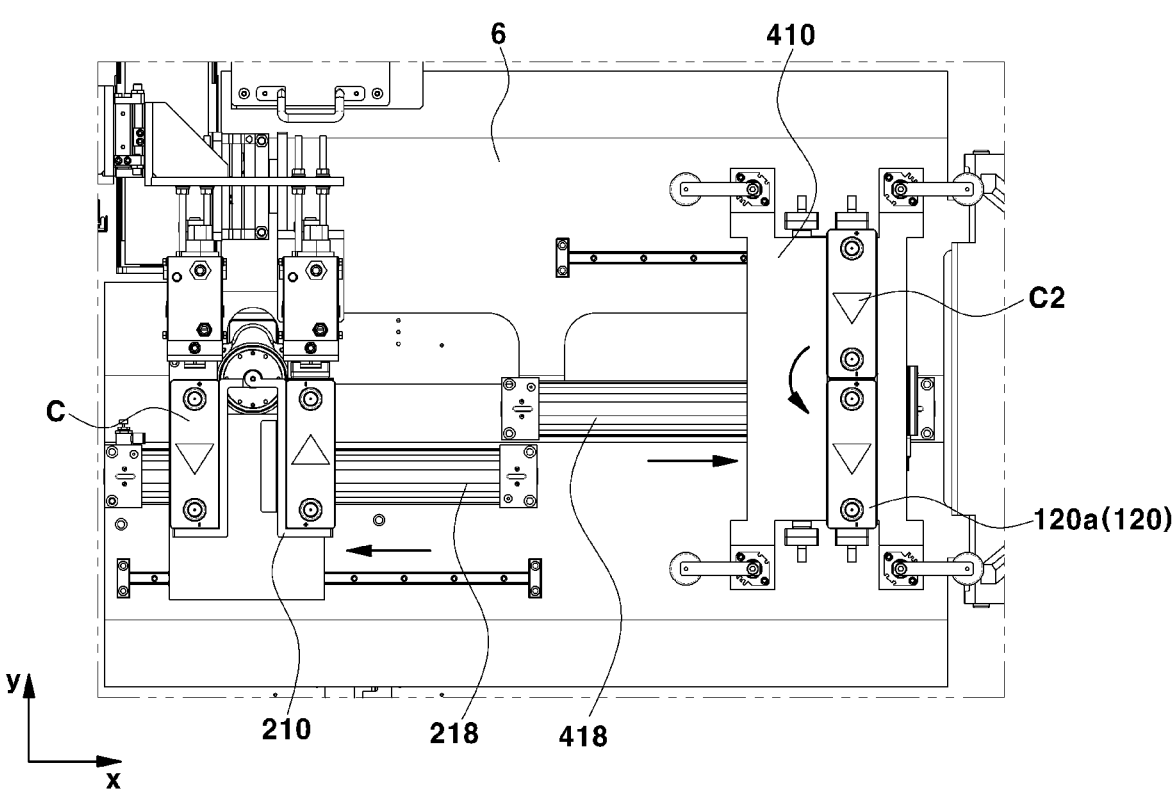

As shown in FIG. 7D, when the two-cell body 120 is transported to the rotary station 410, the cell holder 210 is moved to the original position thereof, i.e., to the upstream assembly unit 200, to prepare for assembly of a next two-cell body 120. Further, as shown in FIG. 12D, the rotary station 410 on which the two-cell body 120 is disposed (hereinafter, the two-cell body which is the first one to be disposed on the rotary station 410 is represented by 120*a* and the two-cell body which is the second one to be disposed on the rotary station is represented by 120*b*) is rotated 180 degrees by the rotary motor 414. Such rotation of the rotary station 410 serves to match the polarities of the first two-cell body 120*a* and the next two-cell body 120*b* with each other.

Figure 7E:
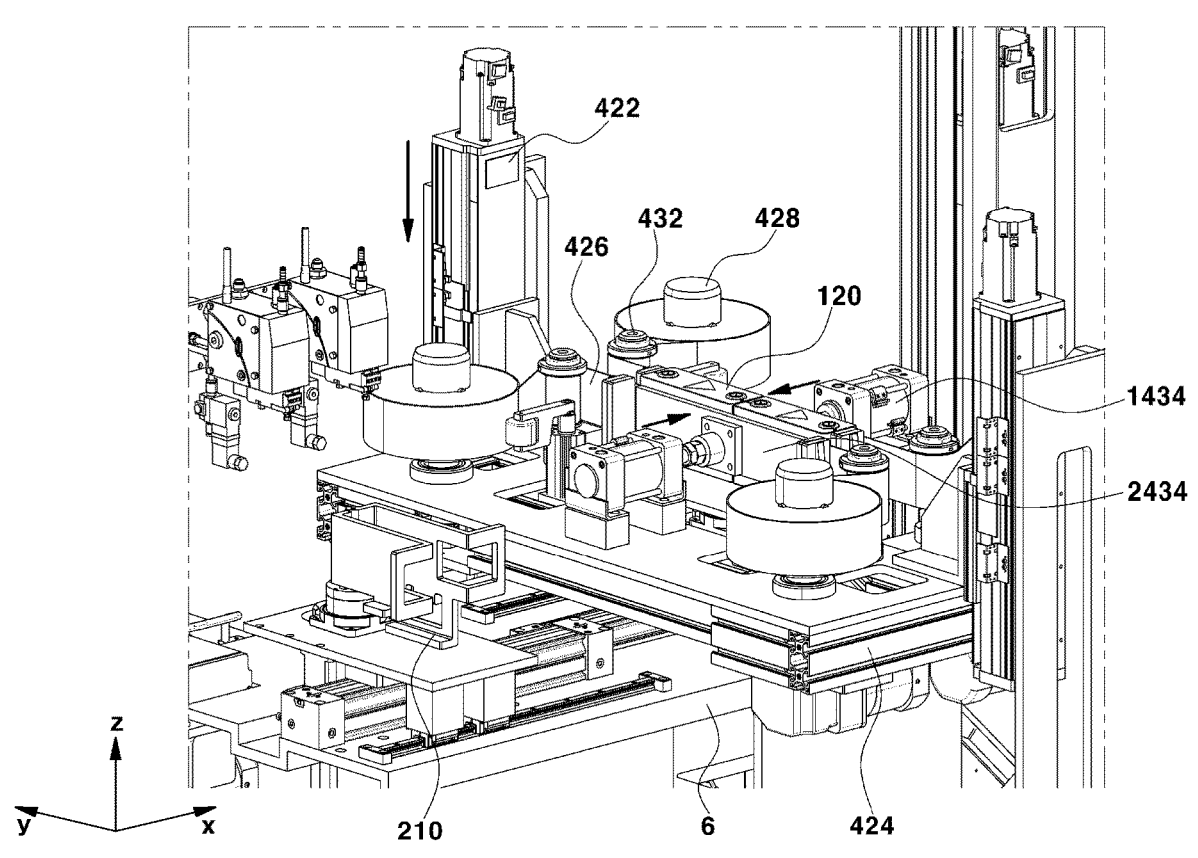
Figure 12E:
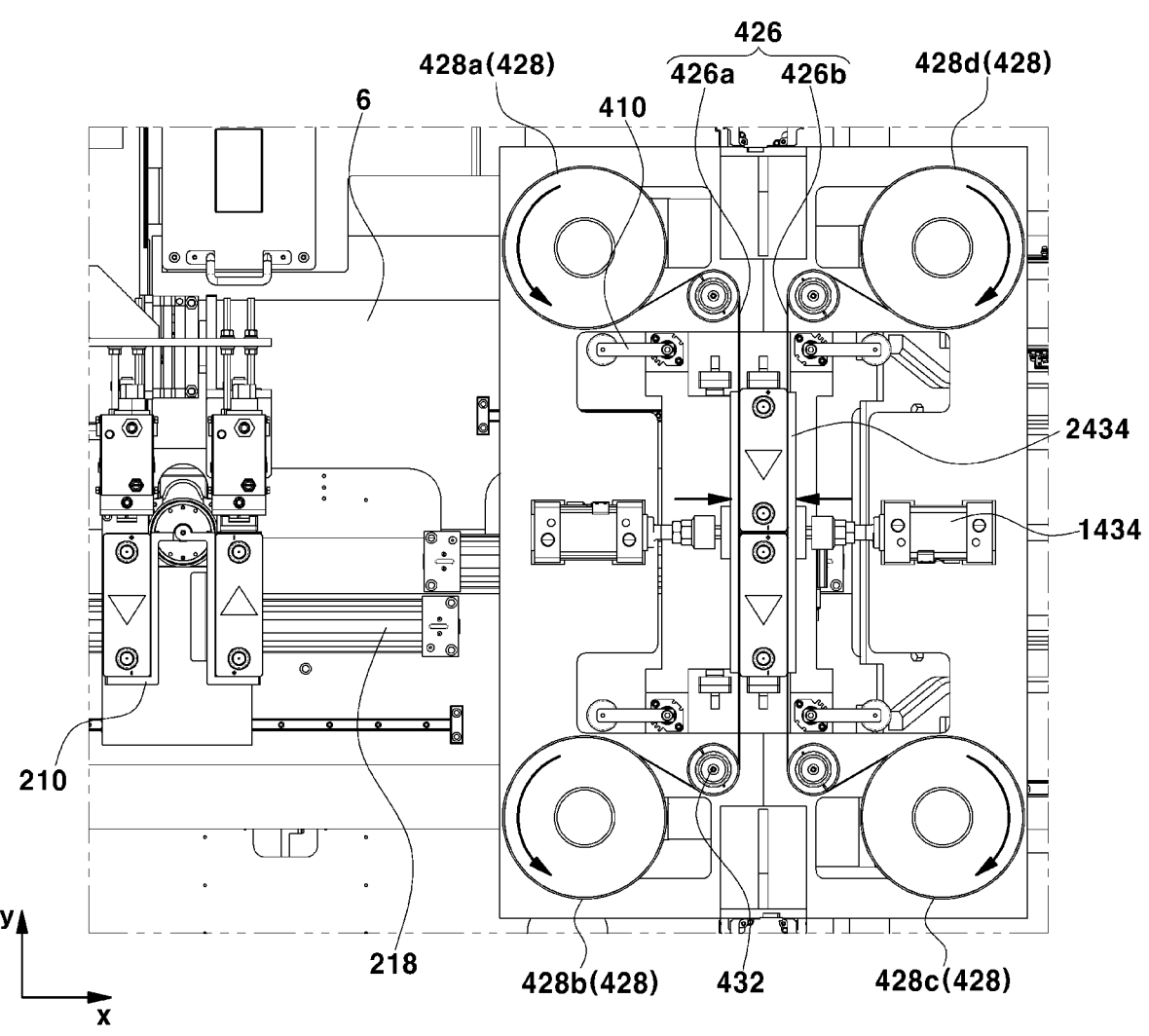

As shown in FIGS. 7E and 12E, the gap pads 426 are attached to the two-cell body 120*a*. The gap pad attacher 420 is lowered to the rotary station 410 by the Z-axis transporter 422. The two-cell body 120*a* is inserted into the insert opening 1424 provided in the moving plate 424, and the two-cell body 120*a* is interposed between the first gap pad sheet 426*a* and the second gap pad sheet 426*b*. The gap pads 426 are attached to both surfaces of the two-cell body 120*a* by the operating units 434. At the same time, the upstream assembly unit 200 executes assembly of the second two-cell body 120*b*.

Figure 7F:
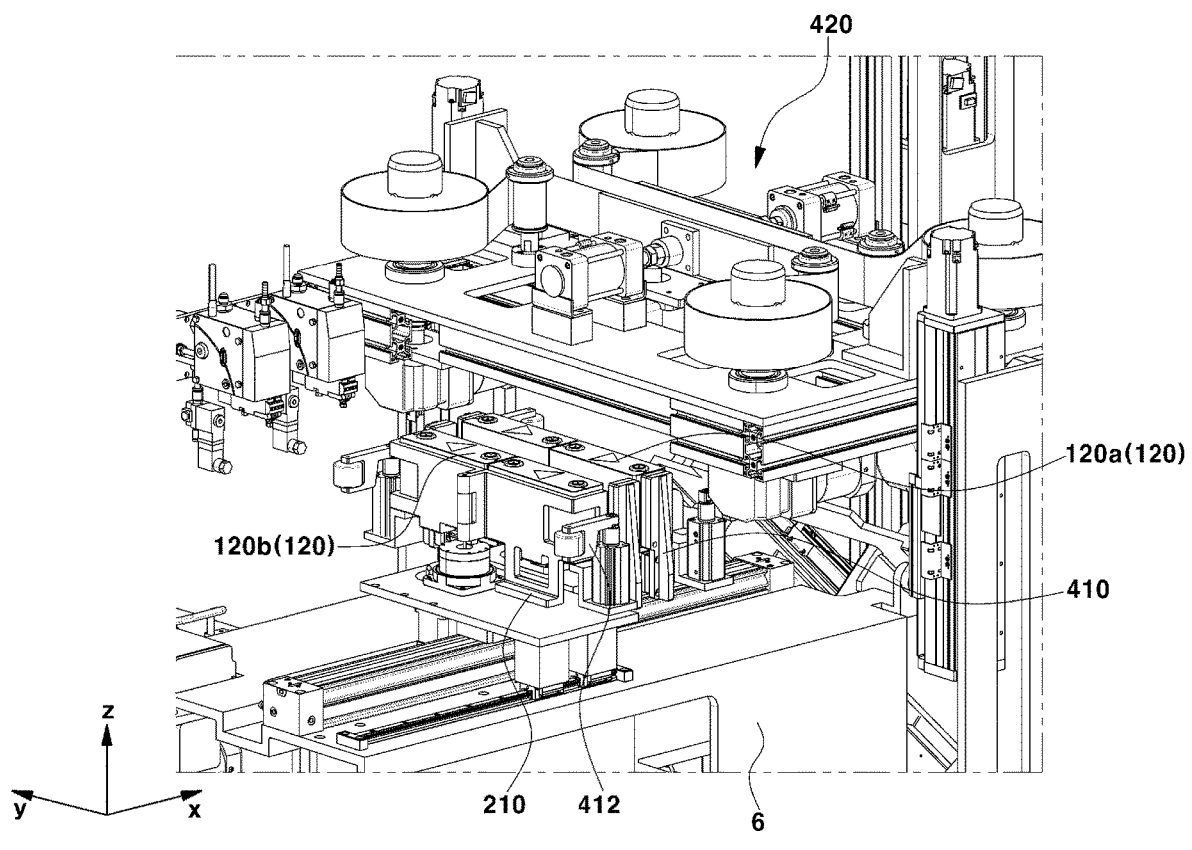
Figure 7G:
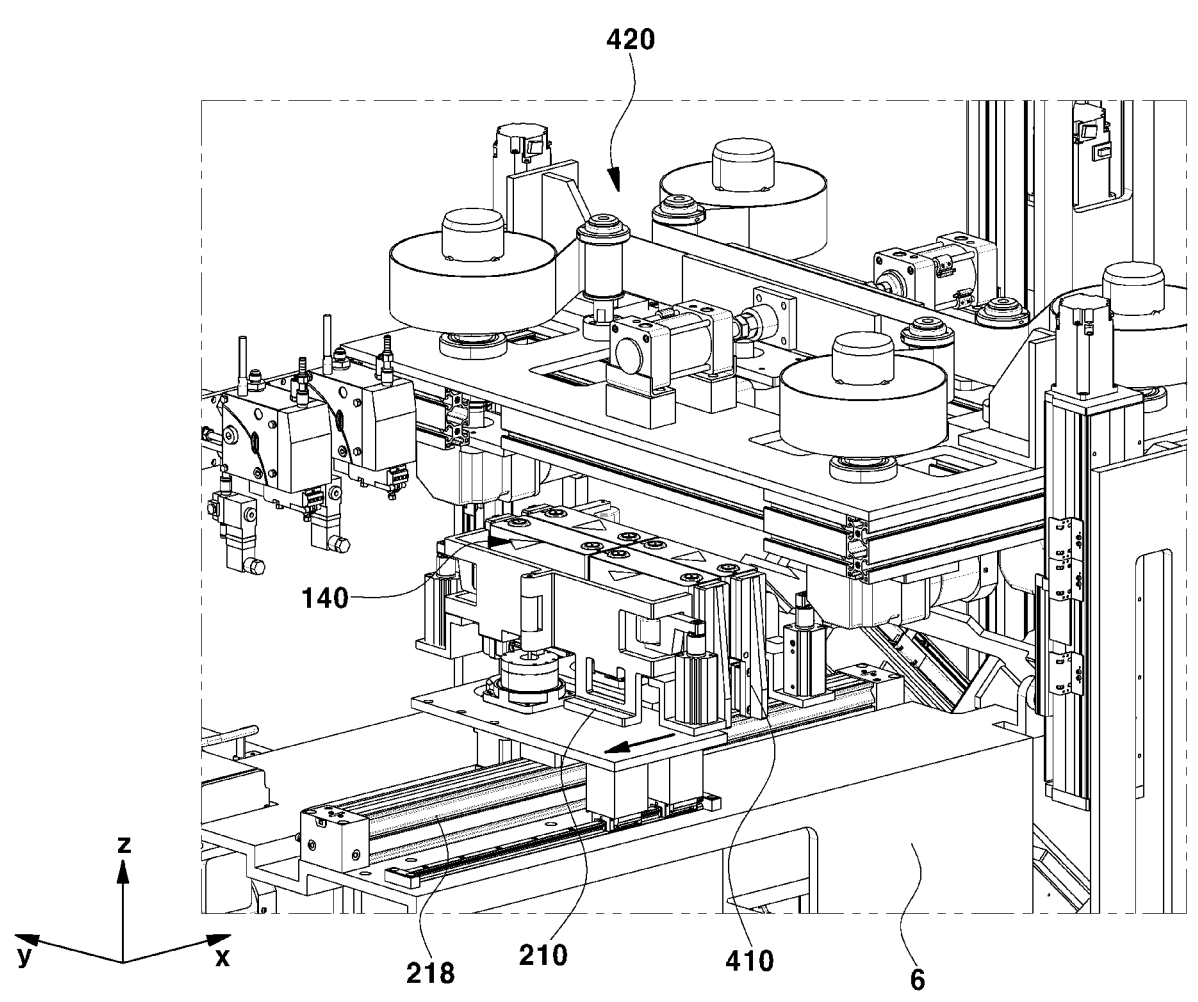
Figure 12F:
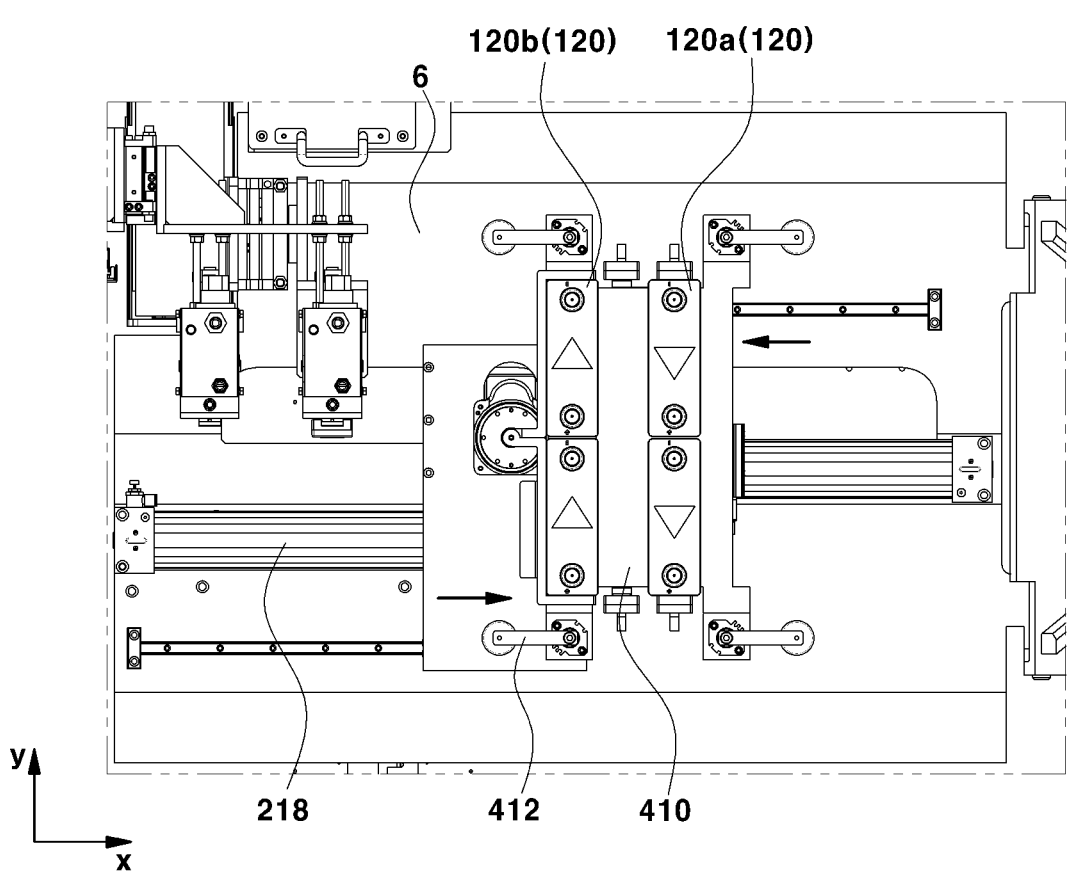
Figure 12G:
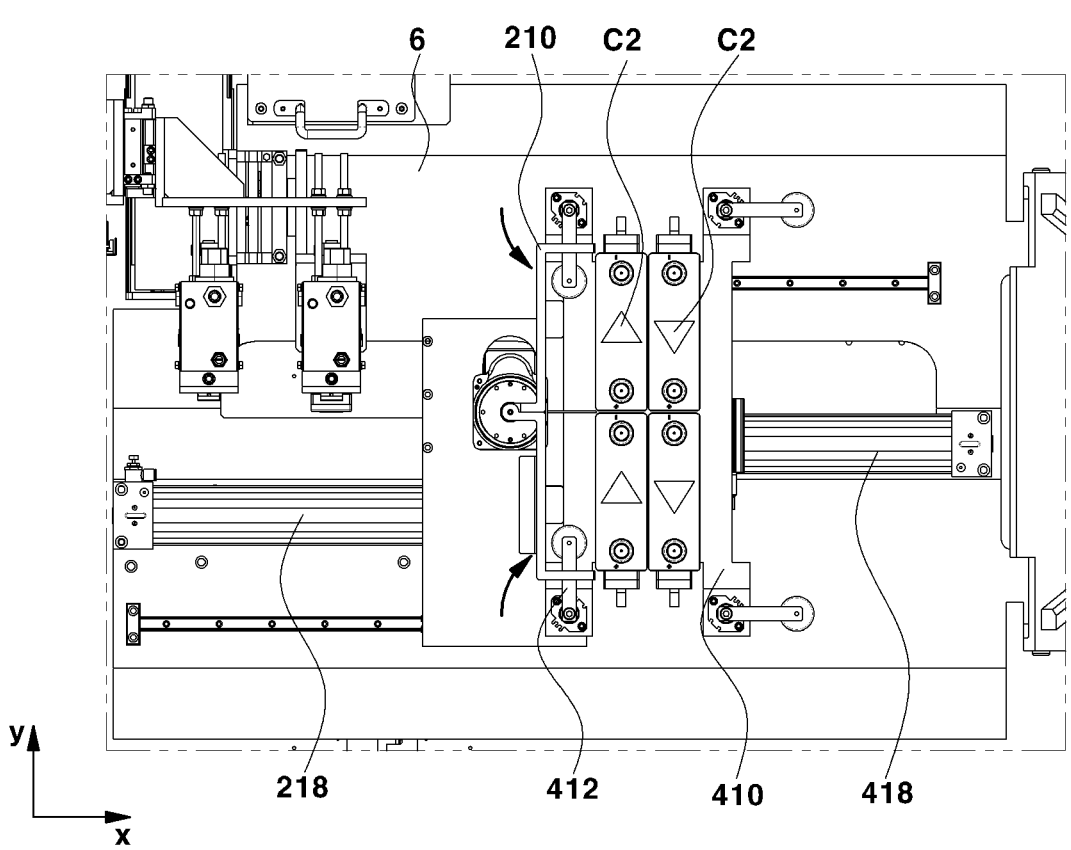

After the gap pads 426 is attached to the two-cell body 120*a*, the gap pad attacher 420 is returned to the original position thereof. Thereafter, as shown in FIGS. 7F and 12F, the second two-cell body 120*b* is transported to the rotary station 410. The second two-cell body 120*b* is loaded on the rotary station 410 in the same manner of loading the first two-cell body 120*a* on the rotary station 410. However, the rotary station 410 is not rotated at this time. As shown in FIGS. 7G and 12G, the second two-cell body 120*b* is coupled to the first two-cell body 120*a* by the carrying arms 412, and the gap pad 426 attached to the first two-cell body 120a is interposed therebetween.

Figure 7H:
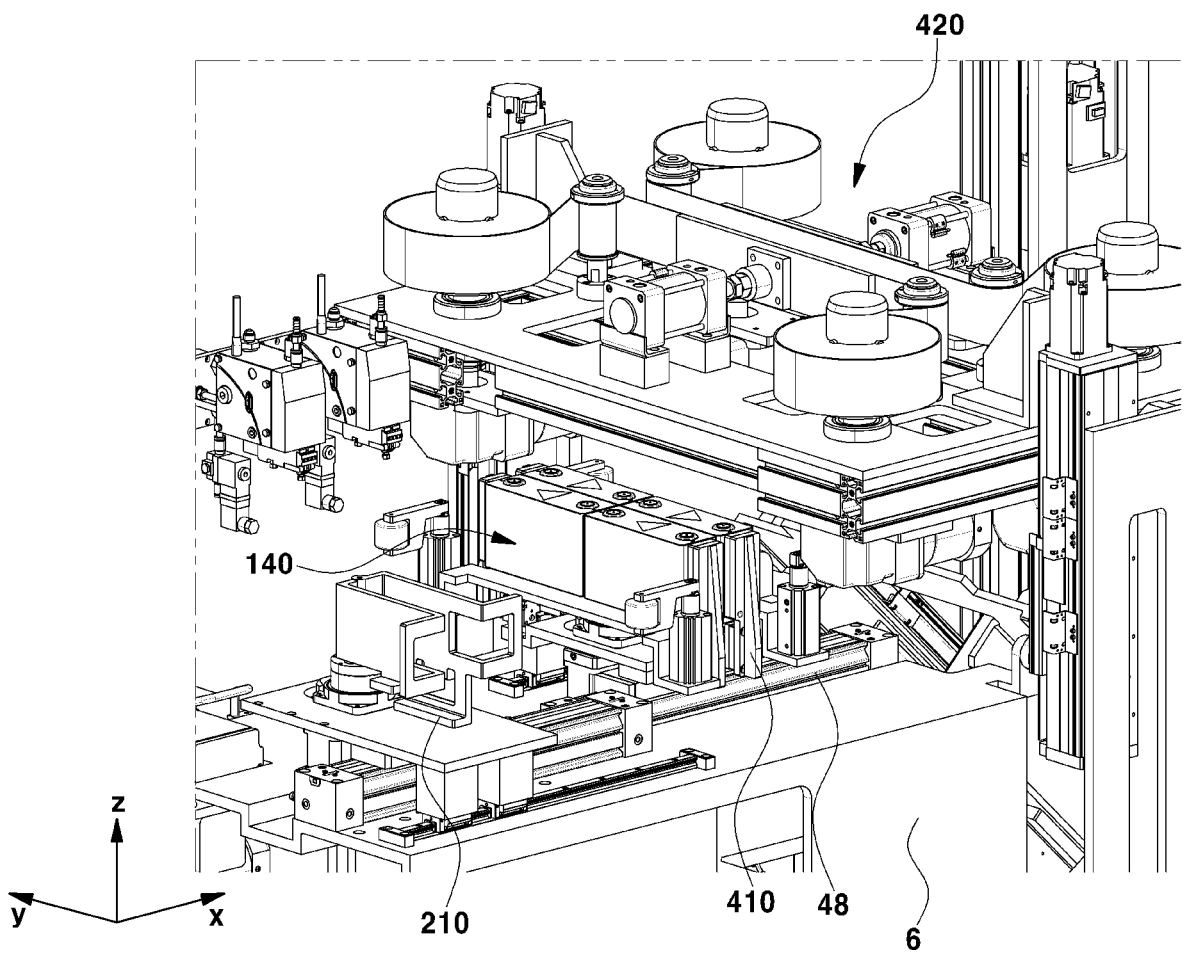
Figure 8:
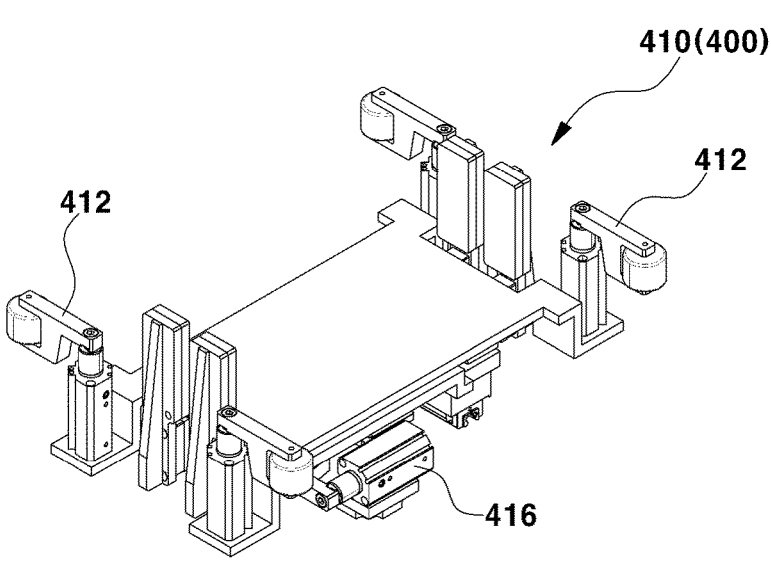
FIG. 8 is a perspective view of a rotary station of the midstream assembly unit according to some implementations of the present disclosure.
Figure 12H:
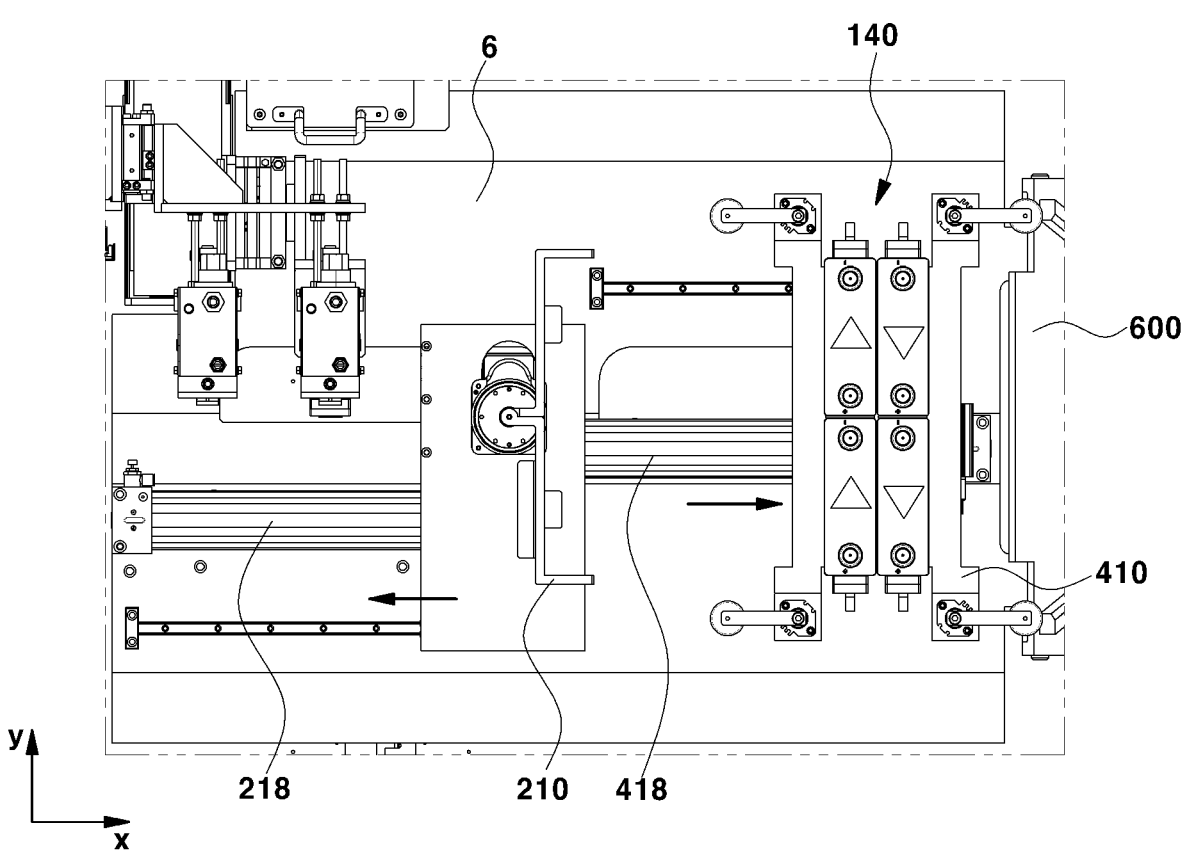

As shown in FIGS. 7H and 12H, the cell holder 210 is returned to the upstream assembly unit 200. The rotary station 410 is moved to the downstream assembly unit 600 by the X-axis transporter 418.

Figure 10A:
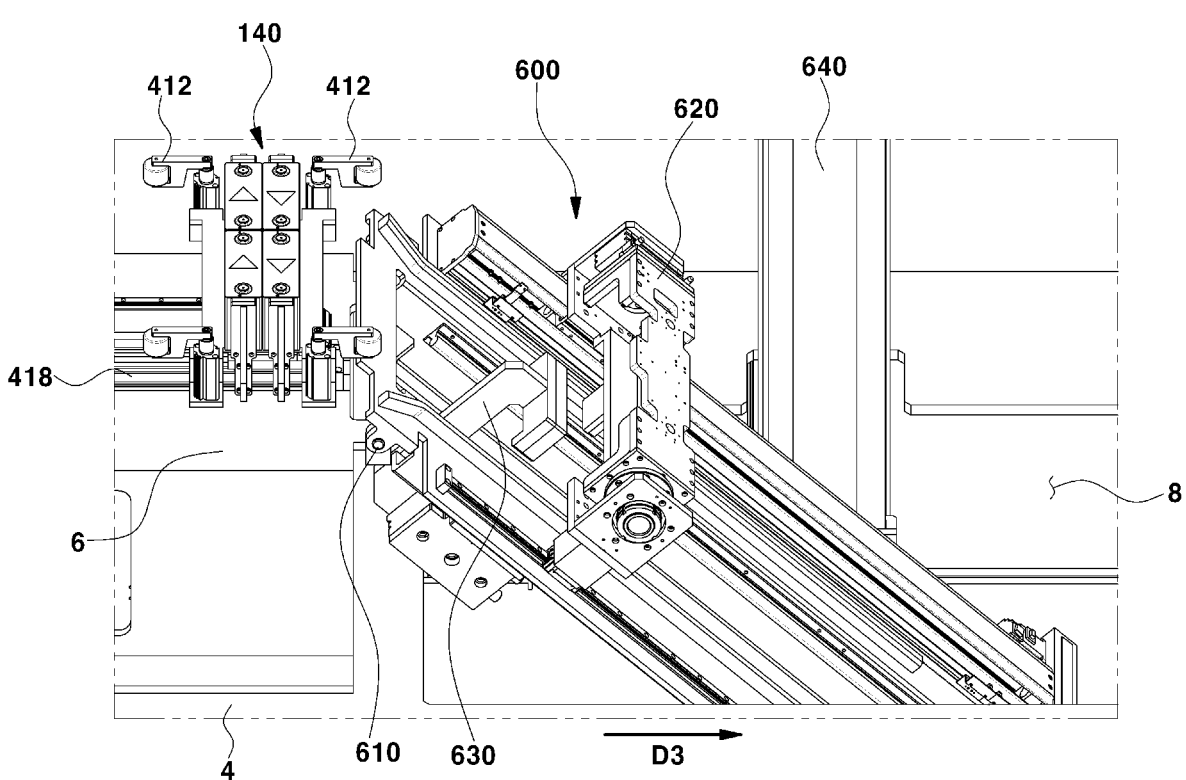
FIGS. 10A to 10E are views illustrating a process of operating a downstream assembly unit according to some implementations of the present disclosure.

As shown in FIG. 10A, the four-cell body 140 including the first two-cell body 120a and the second two-cell body 120b reaches the downstream assembly unit 600.

Figure 10B:
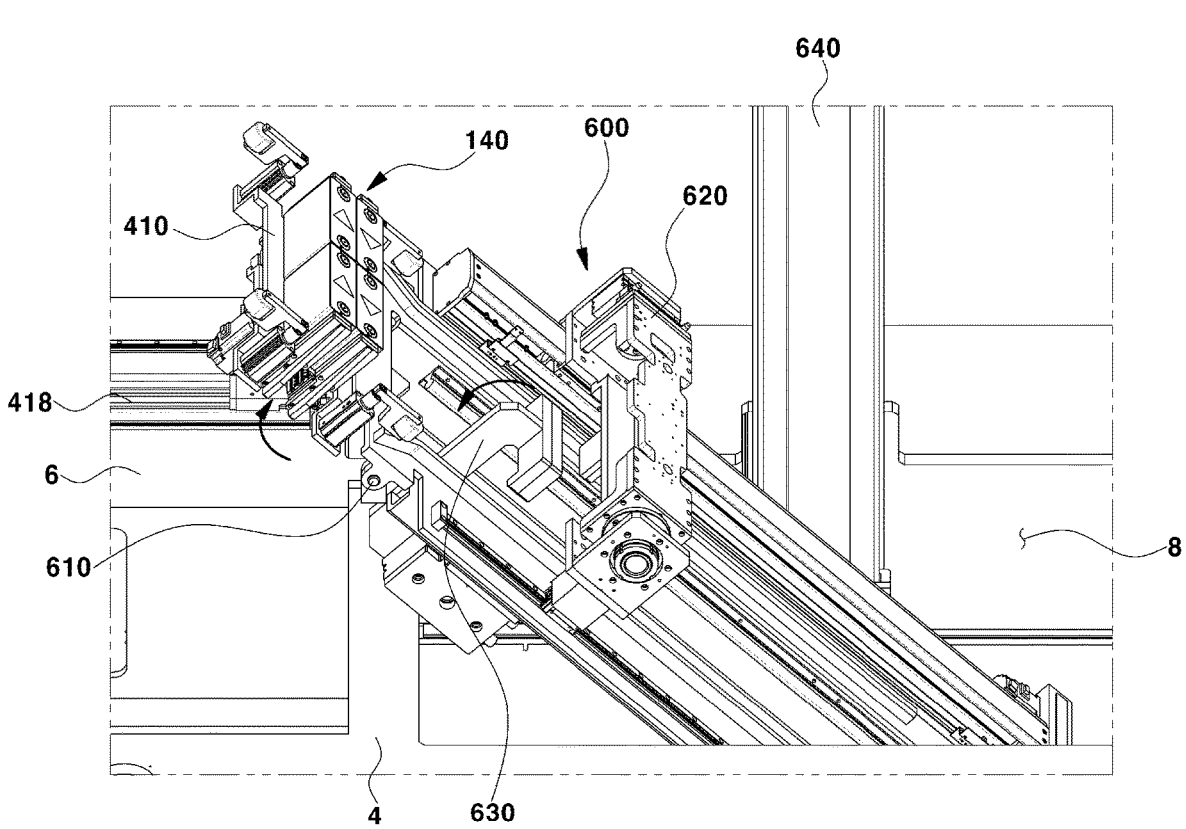

As shown in FIG. 10B, when the four-cell body 140 reaches a predetermined position, the rotary station 410 is rotated with respect to the platform 6 by driving the tilt motor 416, and is thus tilted at a designated angle. For example, the angle of the downstream assembly unit 600 may be the same as the tilt angle of the rotary station 410.

Since the carrying arms 412 face in a direction parallel to the process flow direction D3 to allow the four-cell body 140 to be discharged, the four-cell body 140 may be separated from the rotary station 410 and may be moved to the downstream assembly unit 600. The pressing member 630 is drawn into the downstream assembly unit 600 to allow the four-cell body 140 to be moved to the slider 620 (in the direction of an arrow shown in FIG. 10B).

Figure 10C:
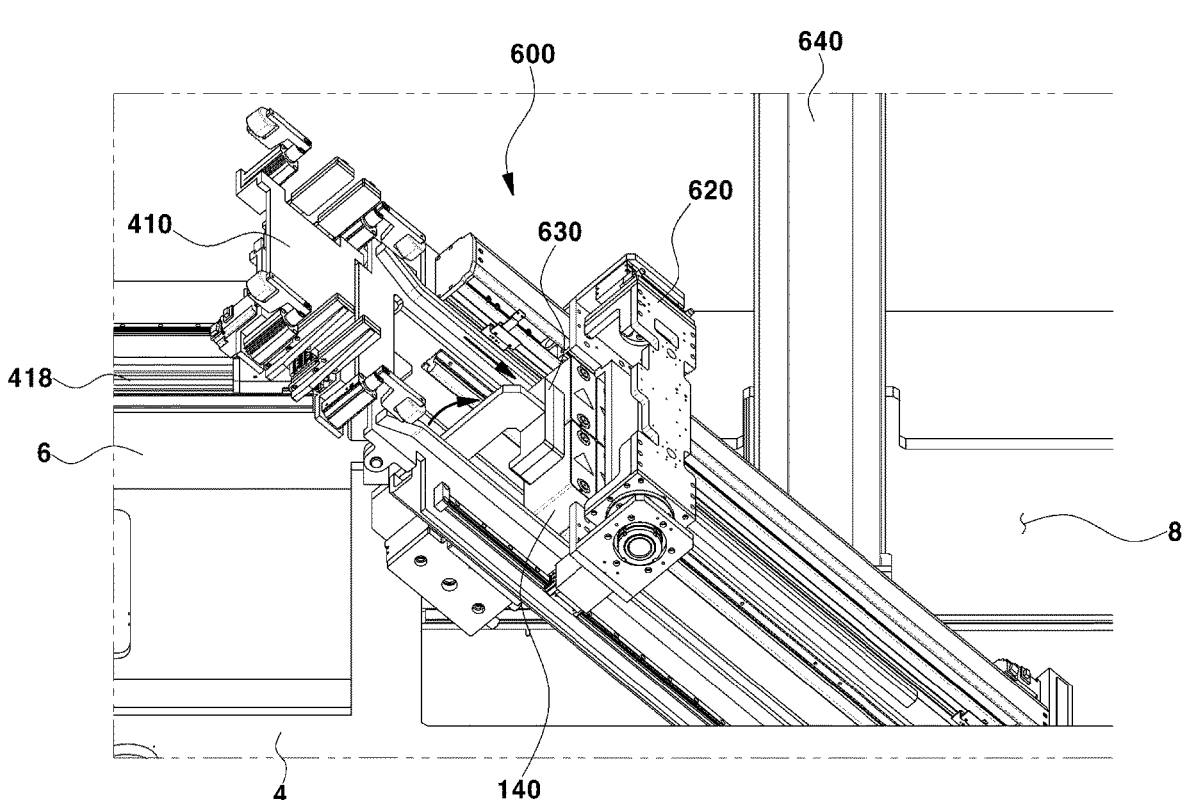
Figure 10D:
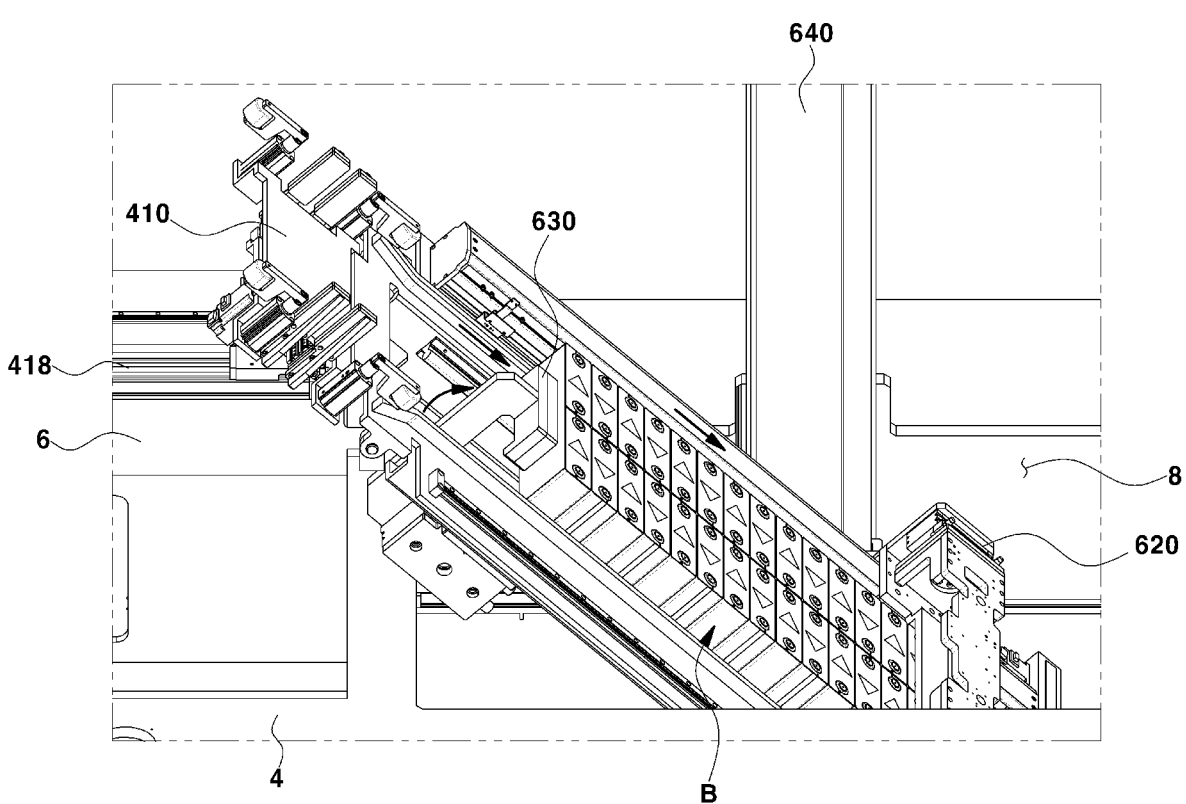

As shown in FIG. 10C, the four-cell body 140 slides to the slider 620, and the pressing member 630 is protruded again to lightly fix the four-cell body 140.

A plurality of four-cell bodies 140 is stacked on the downstream assembly unit 600 by repeating the above-described process. The slider 620 is gradually lowered or moved approximately in the process flow direction D3 whenever another four-cell body 140 is introduced into the downstream assembly unit 600. Further, whenever another four-cell body 140 is introduced into the downstream assembly unit 600, the pressing member 630 may apply pressure to the stacked four-cell bodies 140 to improve coupling force between the four-cell bodies 140.

Figure 10E:
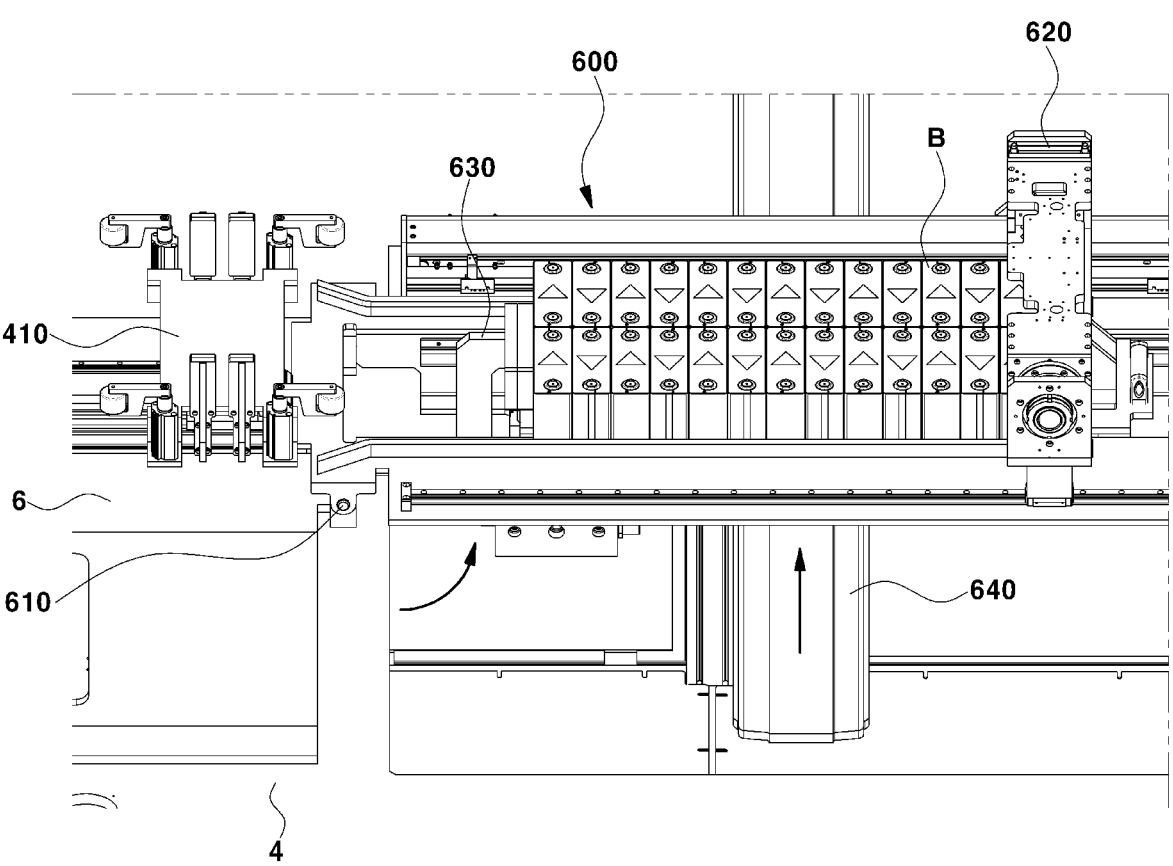

As shown in FIG. 10E, when stack of a predetermined number of four-cell bodies 140 is completed, the lift 640 elevates the downstream assembly unit 600 so that the downstream assembly unit 600 is disposed in a direction parallel to the X-axis direction. Thereafter, the cell block B mounted on the pallet 650 is separated and sent out from the downstream assembly unit 600, thereby completing assembly of the cell block B.

A controller 800 may control operation of each assembly unit 200, 400, 600 based on commands which are stored in advance. The controller 800 may determine operating points in time and operating positions of the assembly units 200, 400, 600 depending on the commands which are stored in advance. The controller 800 may thus supervise and control operation of the apparatus 1. Further, in some implementations, sensing devices configured to the positions of the respective elements may be further provided, and the controller 800 may control the apparatus 1 based on the sensing values of the sensing devices.

As described above, the apparatus according to the present disclosure has been described as finally assembling a cell block through assembly of two-cell bodies and assembly of four-cell bodies. However, the apparatus according to the present disclosure may be used only in assembly of two-cell bodies and assembly of four-cell bodies, or may be used only in assembly of four-cell bodies and assembly of a cell block. Of course, as described above, the apparatus according to the present disclosure may be used to execute assembly of a cell block through assembly of two-cell bodies and assembly of four-cell bodies.

In the present disclosure, the transporters and the drivers are not limited to the units illustrated in the drawings, and may employ any known electric, hydraulic and/or pneumatic devices.

According to the present disclosure, investment costs may be reduced, and an assembly process may be simplified through automation of assembly of a battery.

According to the present disclosure, the possibility of damage to cells during the assembly process may be reduced through simplification of the assembly process.

As is apparent from the above description, the present disclosure provides an apparatus for assembling a cell block of a battery, which may provide a simplified assembly process.

Further, the present disclosure provides an apparatus for assembling a cell block of a battery, which may automate an assembly process.

Moreover, the present disclosure provides an apparatus for assembling a cell block of a battery, which may reduce investment costs in equipment and may simplify an assembly process through automation of the assembly process.

In addition, the present disclosure may reduce the possibility of damage to cells during the assembly process through simplification of the assembly process.

The disclosure has been described in detail with reference to preferred implementations thereof. However, it will be appreciated by those skilled in the art that changes may be made in these implementations without departing from the principles and spirit of the disclosure, the scope of which is defined in the appended claims and their equivalents.

What is claimed is:

1. An apparatus for assembling a cell block of a battery, comprising:
   an upstream assembly unit configured to assemble two cells into a two-cell body; and
   a midstream assembly unit configured (i) to receive from the upstream assembly unit a first two-cell body and a second two-cell body assembled by the upstream assembly unit and (ii) to assemble the first two-cell body and the second two-cell body into a four-cell body from the first two-cell body and the second two-cell body,
   wherein the upstream assembly unit and the midstream assembly unit are operably associated with each other.

2. The apparatus of claim 1, further comprising:
   a downstream assembly unit operating in connection with the midstream assembly unit, and configured to assemble a plurality of four-cell bodies supplied from the midstream assembly unit into a cell block.

3. The apparatus of claim 2, wherein the downstream assembly unit is disposed to be inclined at a designated angle with respect to the midstream assembly unit, and the midstream assembly unit is configured to be tiltable at the same angle as the designated angle of the downstream assembly unit.

4. The apparatus of claim 3, wherein the downstream assembly unit comprises a slider configured to support the four-cell body and to be slidable on the downstream assembly unit.

5. The apparatus of claim 3, wherein the downstream assembly unit comprises a retractable pressing member.

6. The apparatus of claim 3, wherein the downstream assembly unit comprises a lift configured to rotate the downstream assembly unit in a direction parallel to a horizontal direction.

7. The apparatus of claim 2, further comprises a pallet detachably mounted on the downstream assembly unit to transport the cell block to an outside of the downstream assembly unit.

8. The apparatus of claim 1, wherein the upstream assembly unit comprises:

a cell holder for mounting the two cells; and a pad attacher configured to attach an insulating pad to a bonding face of one of the two cells.

9. The apparatus of claim 8, wherein the upstream assembly unit further comprises:

a pad supplier configured to supply the insulating pad, wherein the pad attacher is configured to hold the insulating pad from the pad supplier and to be movable toward the bonding face.

10. The apparatus of claim 8, wherein the cell holder is configured to assemble the two-cell body with the insulating pad attached between the two cells by rotating about a hinge point.

11. The apparatus of claim 10, wherein the cell holder transfers the assembled two-cell body to the midstream assembly unit.

12. The apparatus of claim 8, wherein the upstream assembly unit further comprises:

an adhesive applicator configured to apply an adhesive to bonding faces of the two cells.

13. The apparatus of claim 12, wherein the adhesive applicator is configured to be movable toward the bonding faces.

14. The apparatus of claim 1, wherein the midstream assembly unit comprises:

a rotary station configured to be rotatable; and a gap pad attacher configured to attach gap pads to both surfaces of the first two-cell body disposed on the rotary station.

15. The apparatus of claim 14, wherein the gap pad attacher comprises a moving plate defining an insert opening, and wherein the moving plate is configured to move toward the rotary station to insert the first two-cell body into the insert opening.

16. The apparatus of claim 15, wherein the gap pad attacher further comprises:

at least a pair of winding rollers disposed on the moving plate and configured to unwind the gap pad;

a strip member configured to attach the unwound gap pad to the first two-cell body; and an operation driver configured to provide mobility to the strip member.

17. The apparatus of claim 14, wherein the rotary station comprises:

carrying arms configured to be rotatable and to dispose the first two-cell body received from the upstream assembly unit on the rotary station.

18. The apparatus of claim 14, wherein the rotary station is configured to transfer the assembled four-cell body to a downstream assembly unit.

19. A method of assembling a cell block of a battery, comprising:

supplying two cells to an upstream assembly unit;

assembling the two cells into a two-cell body by the upstream assembly unit;

supplying to a midstream assembly unit a first two-cell body and a second two-cell body sequentially assembled by the upstream assembly unit; and assembling the first two-cell body and the second two-cell body into a four-cell body by the midstream assembly unit.

20. The method of claim 19, further comprising:

assembling one cell block from a plurality of four-cell bodies assembled by the midstream assembly unit.

\* \* \* \* \*